(12) United States Patent
Jackson et al.

(10) Patent No.: US 11,510,533 B2
(45) Date of Patent: Nov. 29, 2022

(54) ANTI-VIRAL, ANTI-BACTERIAL AND ANTI-FUNGAL PORTABLE PERSONAL TOILET SEAT THAT IS RESISTANT TO ALGAE, MOLD AND MILDEW AND THAT CAN BE SAFELY FOLDED AND HELD WITHOUT THE DANGER OF PINCHED FINGERS

(71) Applicants: James Jackson, Atlanta, GA (US); Peter Wong, JinJiang (CN); Anthony Bostick, Tega Cay, SC (US)

(72) Inventors: James Jackson, Atlanta, GA (US); Peter Wong, JinJiang (CN); Anthony Bostick, Tega Cay, SC (US)

( * ) Notice: Subject to any disclaimer, the term of this patent is extended or adjusted under 35 U.S.C. 154(b) by 0 days.

(21) Appl. No.: 17/624,566

(22) PCT Filed: Jun. 23, 2020

(86) PCT No.: PCT/US2020/039198
§ 371 (c)(1),
(2) Date: Jan. 3, 2022

(87) PCT Pub. No.: WO2021/003041
PCT Pub. Date: Jan. 7, 2021

(65) Prior Publication Data
US 2022/0218165 A1    Jul. 14, 2022

Related U.S. Application Data

(60) Provisional application No. 62/870,735, filed on Jul. 4, 2019.

(51) Int. Cl.
A47K 13/00 (2006.01)
A01N 59/00 (2006.01)
A01N 59/18 (2006.01)
A01N 59/26 (2006.01)
A01N 59/16 (2006.01)
A47K 13/12 (2006.01)

(52) U.S. Cl.
CPC ............ A47K 13/005 (2013.01); A01N 59/00 (2013.01); A01N 59/16 (2013.01); A01N 59/18 (2013.01); A01N 59/26 (2013.01); A47K 13/12 (2013.01)

(58) Field of Classification Search
CPC .............................. A47K 13/12; A47K 13/005
USPC ........................................................... 4/240
See application file for complete search history.

(56) References Cited

U.S. PATENT DOCUMENTS

| | | |
|---|---|---|
| 1,592,587 A | 7/1926 | Becker |
| 2,443,068 A | 6/1948 | Dahle |
| 2,457,726 A | 12/1948 | Richards |
| 2,537,504 A | 1/1951 | Anderson |
| 3,261,030 A | 7/1966 | Blern |
| 4,525,880 A | 7/1985 | Bass |
| 5,005,223 A | 4/1991 | Greenwood |
| 5,090,063 A | 2/1992 | Edwards |
| 5,787,514 A | 8/1998 | Erli |
| 6,175,968 B1 | 1/2001 | Schneider |

(Continued)

FOREIGN PATENT DOCUMENTS

WO    WO 2016/109328 A1    7/2021

*Primary Examiner* — Christine J Skubinna
(74) *Attorney, Agent, or Firm* — Hamby Law Firm; Bruce W. Hamby

(57) ABSTRACT

This disclosure describes an anti-viral, anti-bacterial and anti-fungal portable personal toilet seat that is resistant to algae, mold and mildew and that can be safely folded and held without the danger of pinched fingers and without a handle.

8 Claims, 24 Drawing Sheets

(56) References Cited

U.S. PATENT DOCUMENTS

| | | |
|---|---|---|
| D502,766 S | 3/2005 | Nash |
| D816,819 S | 5/2018 | Xu |
| 2008/0109951 A1 | 5/2008 | Datsko |
| 2016/0183745 A1 | 6/2016 | Jackson |
| 2016/0213209 A1 | 7/2016 | Perry |
| 2016/0242606 A1 | 8/2016 | Jackson |

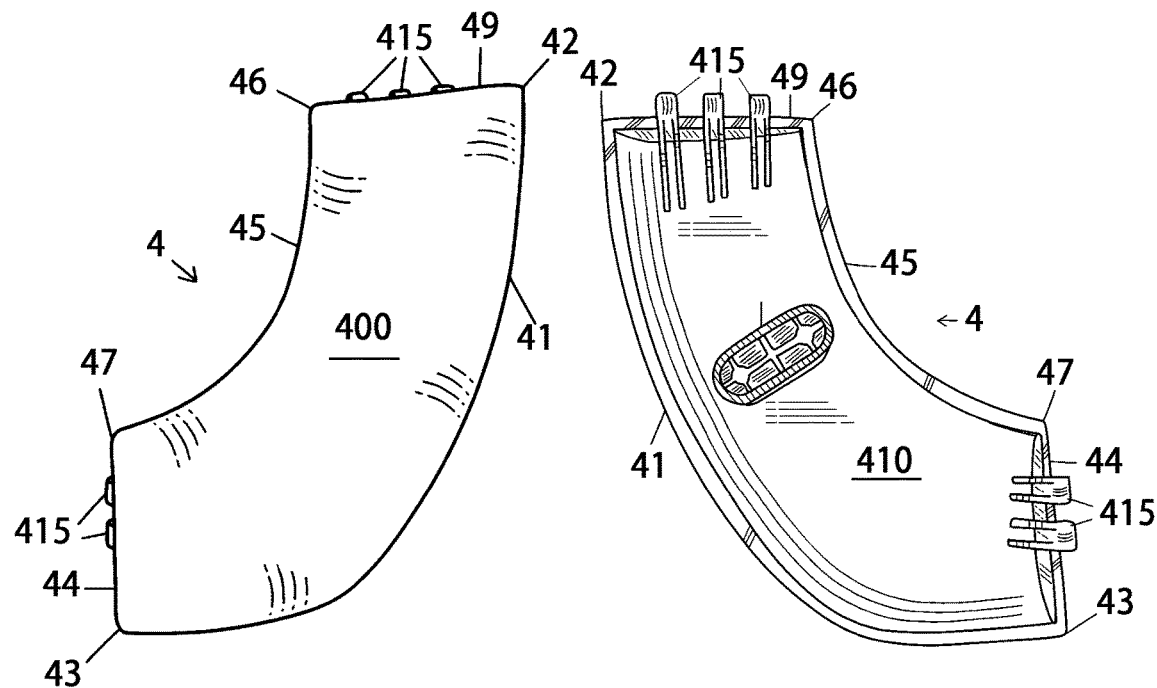
FIG. 28
FIG. 29
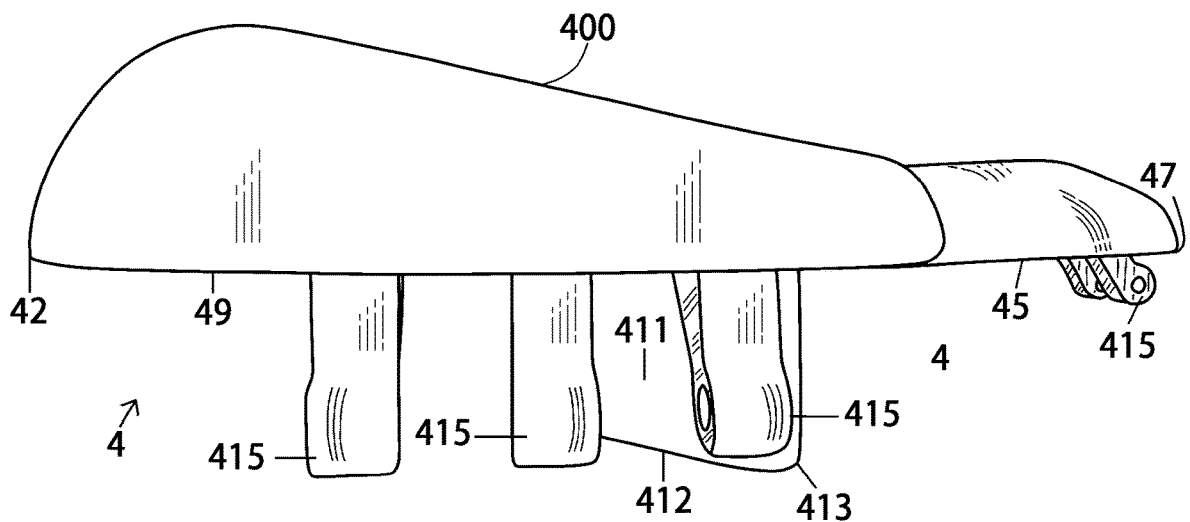
FIG. 30

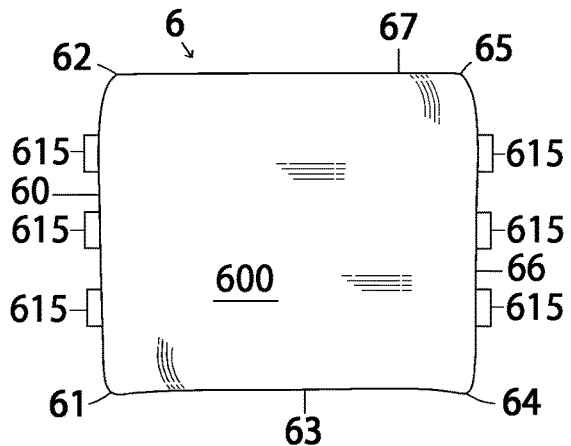 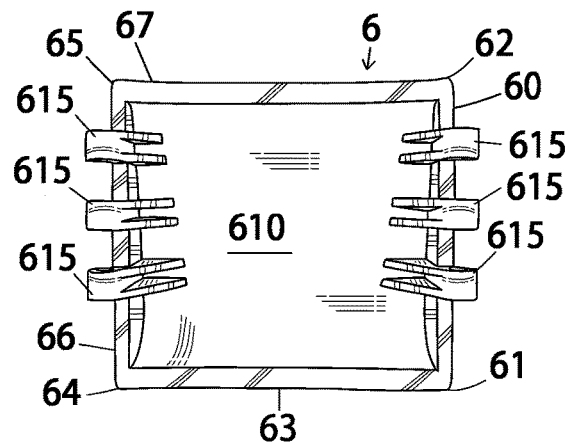
FIG. 34    FIG. 35
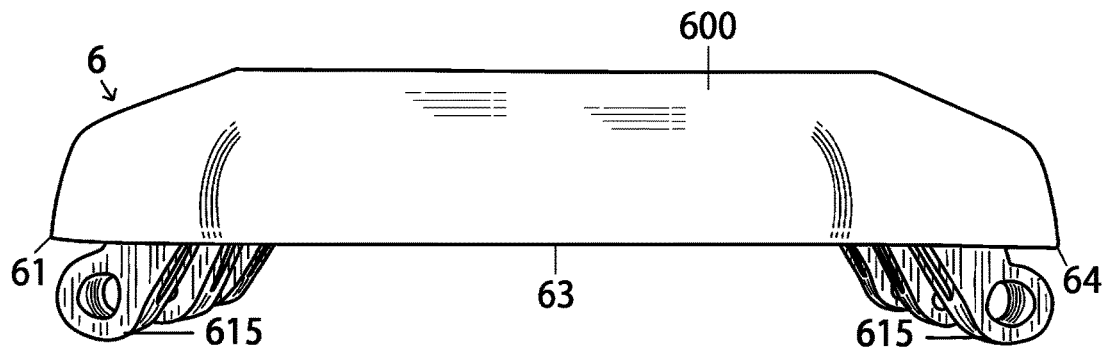
FIG. 36
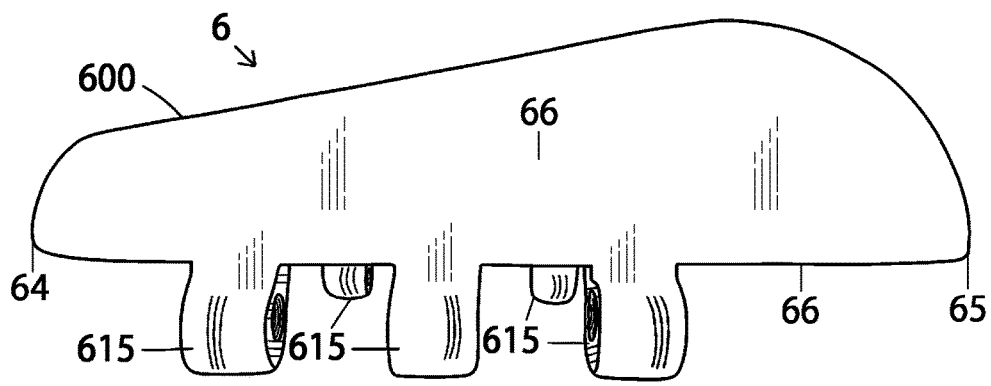
FIG. 37

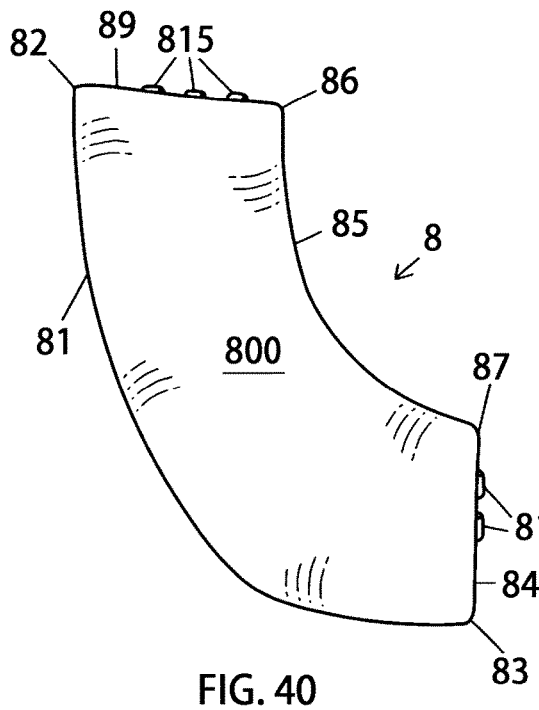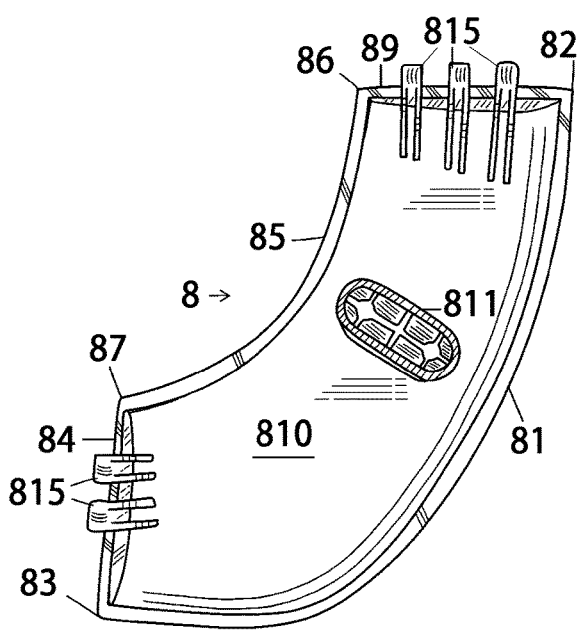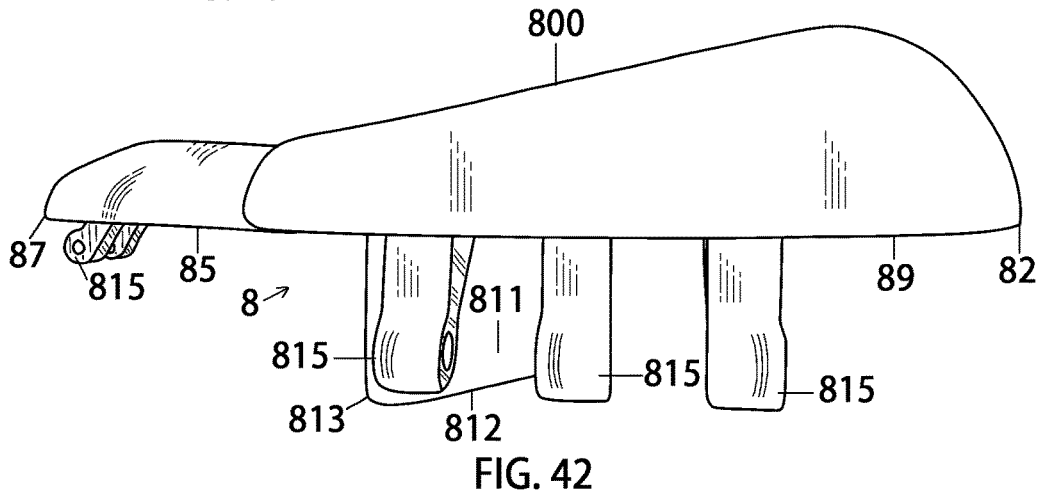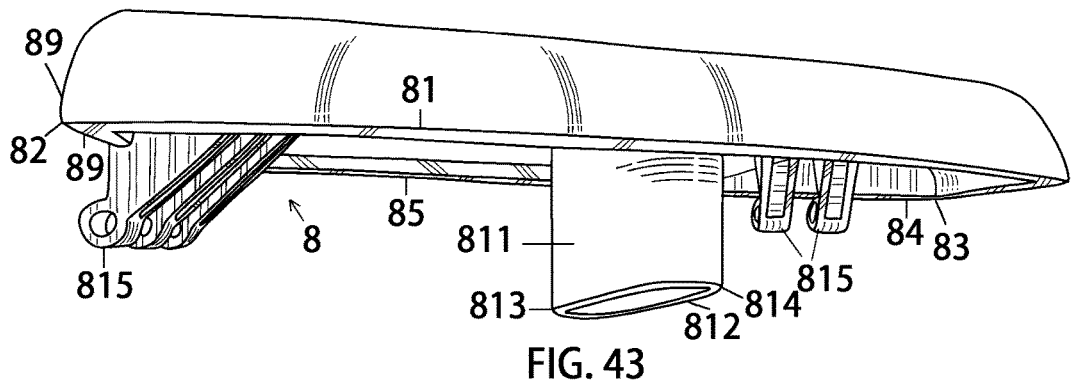

ANTI-VIRAL, ANTI-BACTERIAL AND ANTI-FUNGAL PORTABLE PERSONAL TOILET SEAT THAT IS RESISTANT TO ALGAE, MOLD AND MILDEW AND THAT CAN BE SAFELY FOLDED AND HELD WITHOUT THE DANGER OF PINCHED FINGERS

TECHNICAL FIELD

This application relates to technology involving anti-viral, anti-bacterial and anti-fungal materials and portable personal toilet seats that are resistant to algae, mold and mildew and that can be safely folded and held without the danger of pinched fingers.

BACKGROUND OF THE INVENTION

Efforts have been made to create a portable foldable toilet seat.

Anderson, in U.S. Pat. No. 2,537,504, "Combination Child's Toilet Seat and Carrying Bag," taught a three piece folding toilet seat equipped with a spring hinge.

Edwards, in U.S. Pat. No. 5,090,063, "Packaged Toilet Seat," taught a four piece portable toilet seat, with a carrier equipped with a holder for a roll of toilet paper.

Schneider, in U.S. Pat. No. 6,175,968, "Transportable and Foldable Toilet Seat Attachment Device," taught a two piece folding toilet seat equipped with handles.

Jackson, in WO 2016/109328, "Toilet Seat Cover Assembly," taught a four piece foldable toilet seat equipped with a carrying case.

Jackson, in WO 2017/192169, "Portable Foldable Toilet Seat Overlay Apparatus," taught a two piece foldable toilet seat.

However, these references do not teach the embodiments that are disclosed in this application.

SUMMARY OF INVENTION

Technical Problems

Portable personal toilet seats present at least five integrally interrelated problems that must all be solved simultaneously in a single embodiment in order to produce a superior portable personal toilet seat.

First, toilet seats can be plagued with undesirable and harmful viruses, bacteria, fungi, mold and mildew. Thus the problem exists as to how to create a toilet seat that has anti-viral, anti-bacterial, anti-fungal, anti-mold and anti-mildew properties that are inherent to the seat itself and which are not merely coatings that are susceptible to being wiped off or scraped off when the seat is used or cleaned.

Second, three interrelated problems exist regarding how to design a seat that can be folded without pinching the user's fingers, how to configure such a seat in an easily portable configuration and how to provide a means for a user to easily grasp the entire folded seat without the need for a handle.

Third, there is the problem of how to create alternatives to known foldable toilet seat designs.

Fourth, there is the problem of how to create a novel foldable toilet seat that provides the same or similar effects as existing foldable toilet seats.

Fifth, the problem of how to create a foldable toilet seat that is more cost-effective than existing toilet seats is a significant problem that needs to be resolved.

Collectively, at least the preceding problems comprise the objective technical problem of how to produce a superior toilet seat.

Solutions to the Problems

One solution to the problem of how to create a toilet seat that has anti-viral, anti-bacterial, anti-fungal, anti-algae, anti-mold and anti-mildew properties that are inherent to the seat itself and that are not merely coatings that can be wiped off or scraped off like a mere coating could be is to have the toilet seat comprised of parts that have sources of metal ions mixed into them so as to impart anti-viral, anti-bacterial, and anti-fungal properties to the toilet seat.

One solution to the three interrelated problems of how to design a seat that can be folded without pinching the user's fingers, how to configure such a seat in an easily portable configuration and how to provide a means for a user to easily grasp the entire folded seat without the need for a handle, is to configure the seat in the manner disclosed herein.

One solution to the problems of how to create alternatives to known foldable toilet seats, how to create a foldable toilet seat that provides the same or similar effects as existing foldable toilet seats and how to create a foldable toilet seat that is more cost-effective than existing toilet seats, is to configure the seat in the manner disclosed herein.

Advantageous Effects of the Disclosed Embodiments

One advantage of the disclosed embodiments is that anti-viral, anti-bacterial, anti-fungal, anti-algae, anti-mold and anti-mildew properties are made inherent to the seat itself are not susceptible to inadvertent removal in the same manner that mere coatings are.

Another advantage of the disclosed embodiments is that they can be folded without pinching the user's fingers, configured in an easily portable configuration and provide a means for a user to easily grasp the entire folded seat without the need for a handle.

Yet another advantage of the disclosed embodiments is that they provide alternatives to known foldable toilet seats, they provide the same or similar effects as existing foldable toilet seats and are more cost-effective than existing toilet seats.

BRIEF DESCRIPTION OF THE DRAWINGS

FIG. 28 is a top plan view of an exemplary embodiment of a right rear folding piece.

FIG. 29 is a bottom plan view of an exemplary embodiment of a right rear folding piece.

FIG. 30 is a front elevation view of an exemplary embodiment of a right rear folding piece.

FIG. 34 is a top plan view of an exemplary embodiment of a left and right rear connecting piece.

FIG. 35 is a bottom plan view of an exemplary embodiment of a left and right rear connecting piece.

FIG. 36 is a front elevation view of an exemplary embodiment of a left and right rear connecting piece.

FIG. 37 is a left elevation view of an exemplary embodiment of a left and right rear connecting piece.

FIG. 40 is a top plan view of an exemplary embodiment of a left rear folding piece.

FIG. 41 is a bottom plan view of an exemplary embodiment of a left rear folding piece.

FIG. 42 is a front elevation view of an exemplary embodiment of a left rear folding piece.

FIG. 43 is a left elevation view of an exemplary embodiment of a left rear folding piece.

DESCRIPTION OF THE DISCLOSED EMBODIMENTS

Figure 1:
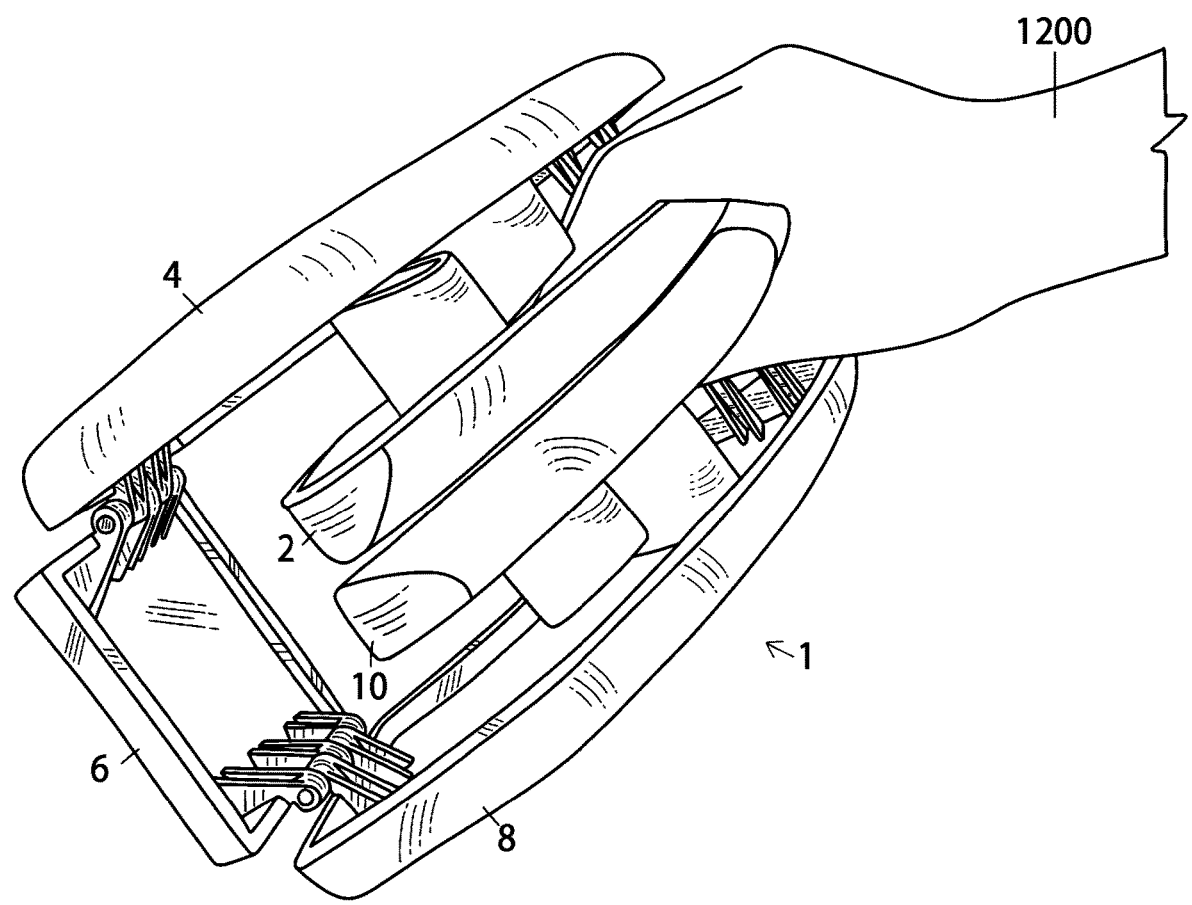
FIG. 1 depicts an exemplary embodiment that has been folded without pinching the user's fingers, configured in an easily portable configuration that provides a means for a user to easily grasp the entire folded seat without the need for a handle.

First Exemplary Embodiment: An Anti-Viral, Anti-Bacterial and Anti-Fungal Toilet Seat that is Resistant to Algae, Mold and Mildew and that Can Be Safely Folded and Held without the Danger of Pinched Fingers Viruses, such as COVID-19, bacteria, fungus, mold and mildew can all pose significant hygienic challenges, particularly within the context of portable foldable toilet seats. The disclosed embodiments show how to address these challenges within the context of a mechanically novel portable foldable toilet seat that can be safely folded and held without the danger of pinched fingers and without the need for a dedicated handle.

Silver ions, $Ag^+$, are effective for combating viruses, bacteria, fungi, algae, mold and mildew. Ions of copper, zinc, iron, gold, platinum, palladium, lead, tin, mercury, cadmium, chromium, nickel and cobalt also possess similar desirable properties. However, the problem is how to turn a portable toilet seat into a vehicle for consistently delivering a sufficient supply of metallic ions over an extended period of time so that the user of the portable toilet seat can realize the benefits of the presence of metallic ions, even after the seat has been used many times, has been cleaned repeatedly and may have been scratched or have suffered mechanical damage.

A solution to this problem is to make the seat out of a plastic, such as, for example, Acrylonitrile Butadiene Styrene ("ABS"), that is impregnated with silver-containing ion-exchange resins, such as soluble glass or zirconium phosphate. This will allow the portable foldable toilet seat to serve as a vehicle for consistently delivering a sufficient supply of metallic ions over an extended period of time, thus creating a toilet seat with properties that combat viruses, bacteria, fungi, algae, mold and mildew.

As a non-limiting example, it is possible to provide for the gradual dissemination of metallic ions onto the surface of a portable foldable toilet and to thereby impart to the seat anti-viral, anti-bacterial, anti-fungal, anti-algae, anti-mold and anti-mildew properties. This can be done by making the portable foldable toilet seat out of a plastic such as, for example, ABS, and impregnating the ABS with inorganic carrying compounds that are capable of dissociating into metal ions, said inorganic carrying compounds including substances such as soluble glass, zirconium phosphate, calcium phosphate, zeolite, silica gel, titanium oxide and porous ceramics that contain, and allow for the dissemination of, metal ions via ion-exchange, said metal ions comprising one or more metals such as silver, copper, zinc, iron, gold, platinum, palladium, lead, tin, mercury, cadmium, chromium, nickel and cobalt.

As a further non-limiting example, soluble silicates, such as Ishizuka Glass Co., Ltd.'s IONPURE brand soluble silver glass can be used in a concentration of at least 2 percent up to a Maximum Concentration of 6 percent on a dry weight basis of finished products, in ABS plastic to fabricate the disclosed portable foldable toilet seat. The result of doing this is that the glass will dissolve and release silver, zinc or copper ions onto the surface of the portable toilet seat. The effect of this will be to suppress viruses as well as the growth of bacteria, algae, fungus, mold and mildew, as well as the unpleasant odors, discoloration and staining that can be caused by bacteria, algae, fungus, mold and mildew. The soluble glass will dissolve when exposed to moisture, such as human sweat, thereby releasing the desired metal ions onto the surface of the portable foldable toilet seat. Other sources of moisture such as humidity and the application of water will have the same effect.

As another non-limiting example, zirconium phosphate can be used as a silver ion carrier and mixed into ABS plastic to fabricate the disclosed portable foldable toilet seat. Alphasan® RC 2000 (Milliken and Co., Spartanburg, S. C.) is an example of a commercially available metal ion carrier that can be used to obtain the slow release of metallic ions onto a portable foldable toilet seat when it is mixed with ABS plastic. Alphasan is a zirconium phosphate-based ceramic ion-exchange resin containing silver.

The mechanics of how to construct an exemplary embodiment of the new portable foldable toilet seat are illustrated in the attached drawings, which are summarized in part below. The exemplary embodiment illustrated below employs a plurality of stanchions and raised pivot supports on a right front folding piece, a right rear folding piece, a left front folding piece and a left rear folding piece. The stanchions support the new portable foldable toilet seat and raise it off of the permanent toilet seat or toilet bowl, along with the raised pivot supports and the hinge connection means that join the front and rear pieces together. The proportions of the height of the stanchions to the height of the raised pivot supports enable, in part, the novel nature of the disclosed embodiment.

Specifically, the following proportions should be used when constructing the disclosed exemplary embodiment:
as to the right front folding piece (2):
a raised pivot support (215) protruding downward from the bottom surface (210) of the right front folding piece (2) that is at least the longer of the distance that the tallest right front stanchion (211) protrudes from the bottom surface (210) of the right front folding piece (2) or of the distance that the tallest right rear stanchion (411) protrudes from a bottom surface (410) of a right rear folding piece (4);
as to the right rear folding piece (4):
a raised pivot support (415) on the anterior surface (49) protruding downward from the bottom surface (410) of the right rear folding piece (4) that is at least the longer of the distance that the tallest right front stanchion (211) protrudes from the bottom surface (210) of the right front folding piece (2) or of the distance that the tallest right rear stanchion (411) protrudes from the bottom surface (410) of the right rear folding piece (4);
as to the left rear folding piece (8):
a raised pivot support (815) on the anterior surface (89) protruding downward from the bottom surface (810) of the left rear folding piece (8) that is at least the longer of the distance that the tallest left front stanchion (10011) protrudes downward from the bottom surface (10010) of the left front folding piece (10) or the distance that the tallest left rear stanchion (811) protrudes from the bottom surface (810) of the right rear folding piece (8);
and as to the left front folding piece (10):
a raised pivot support (10015) protruding downward from the bottom surface (10010) of the left front folding piece (10) that is at least the longer of the distance that the tallest left front stanchion (10011) protrudes from the bottom surface (10010) of the left front folding piece (10).

Additionally, the disclosed embodiment illustrates that:
any right rear stanchions (411) that extend down from the bottom surface (410) are to be positioned in such a manner that no right rear stanchion (411) will make contact with any right front stanchion (211) when the right front folding piece (2) is folded toward the right rear folding piece (4); and
any left rear stanchions (811) that extend down from the bottom surface (810) are to be positioned in such a manner that no left rear stanchion (811) will make contact with any left front stanchion (10011) when the left front folding piece (10) is folded toward the left rear folding piece (8).

Other features of the disclosed exemplary embodiment are described in the discussions below of the accompanying drawings and the various elements disclosed therein, whether or not those elements are identified by specific numbers or lead lines.

FIG. 1 shows an embodiment of a portable foldable toilet seat (1) that can be grasped by a human hand (1200) when folded into an easily portable configuration that does not pinch any fingers and without the need for a handle. FIG. 1 discloses an embodiment of a portable foldable toilet seat comprised of a right front folding piece (2), a right rear folding piece (4), a left and right rear connecting piece (6), a left rear folding piece (8), and a left front folding piece (10).

Figure 2:
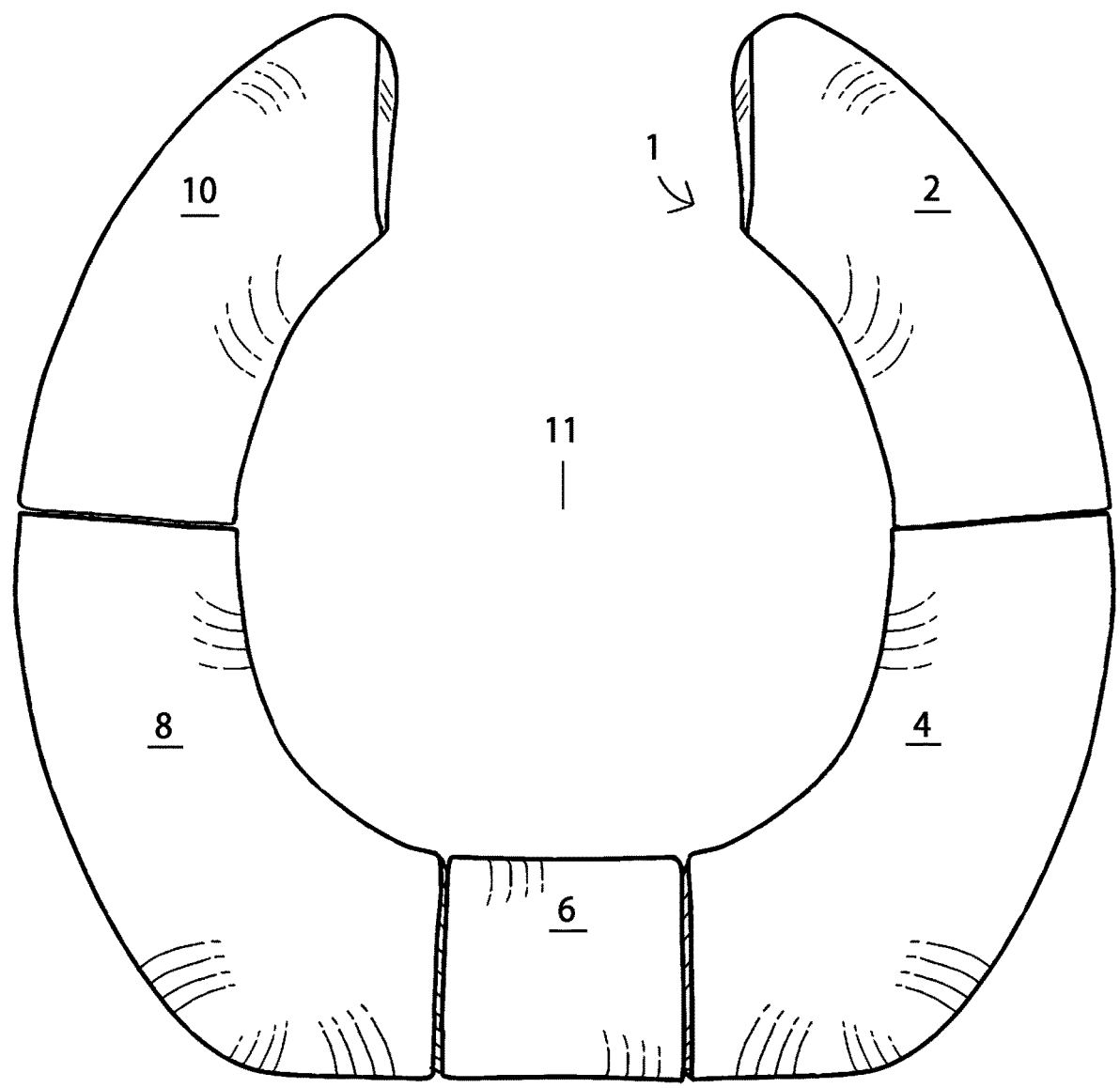
FIG. 2 is a top plan view of an exemplary embodiment.

FIG. 2 reveals a fully deployed configuration of the portable foldable toilet seat (1) of FIG. 1 as viewed from the top, that is, from the side that interfaces with a user of the seat. The right front folding piece (2), right rear folding piece (4), left and right rear connecting piece (6), left rear folding piece (8) and left front folding piece (10) are all depicted as being deployed circumferentially around a central aperture (11).

Figure 3:
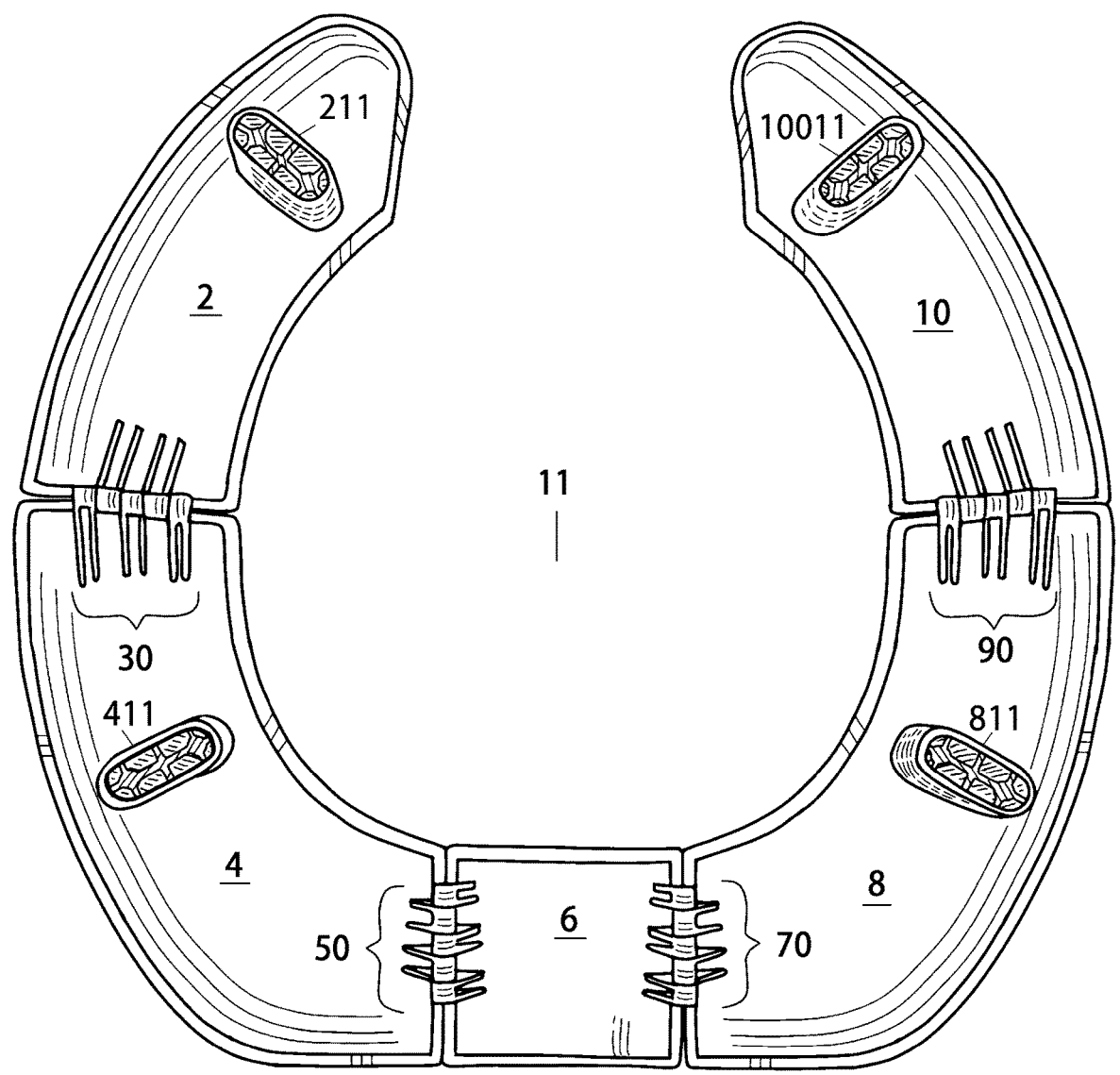
FIG. 3 is a bottom plan view of an exemplary embodiment.

FIG. 3 reveals a fully deployed configuration of the portable foldable toilet seat (1) of FIG. 1 as viewed from the bottom, that is, from the side that interfaces with a toilet bowl or on a toilet seat. In addition to showing the right front folding piece (2), right rear folding piece (4), left and right rear connecting piece (6), left rear folding piece (8), and left front folding piece (10) deployed circumferentially around a central aperture (11), FIG. 3 also shows a right front stanchion (211), a right rear stanchion (411), a right rear stanchion (811), and a left front stanchion (10011). FIG. 3 further shows that the right front folding piece (2) is connected to the right rear folding piece (4) by a hinge connection means (30), the right rear folding piece (4) is connected to the left and right rear connecting piece (6) by a hinge connection means (50), that the left and right rear connecting piece (6) is connected to the left rear folding piece (8) by a hinge connection means (70), and that the left rear folding piece (8) is connected to the left front folding piece (10) by a hinge connection means (90).

In FIG. 3, each of the following elements are depicted as being in a first position, i.e., fully deployed for the toilet seat to be sat upon: the right front folding piece (2), the right rear folding piece (4), the left and right rear connecting piece (6), the left rear folding piece (8), and the left front folding piece (10).

Figure 4:
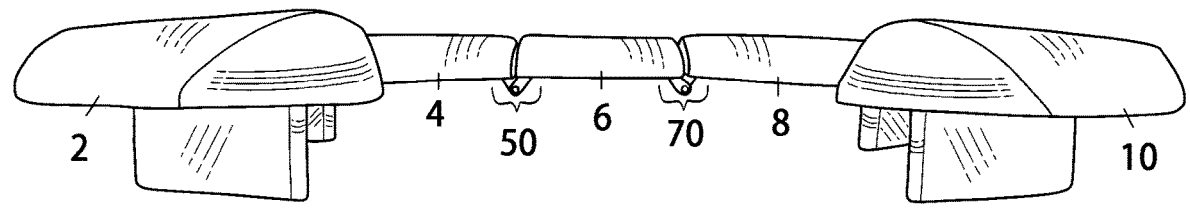
FIG. 4 is a front elevation view of an exemplary embodiment.
Figure 5:
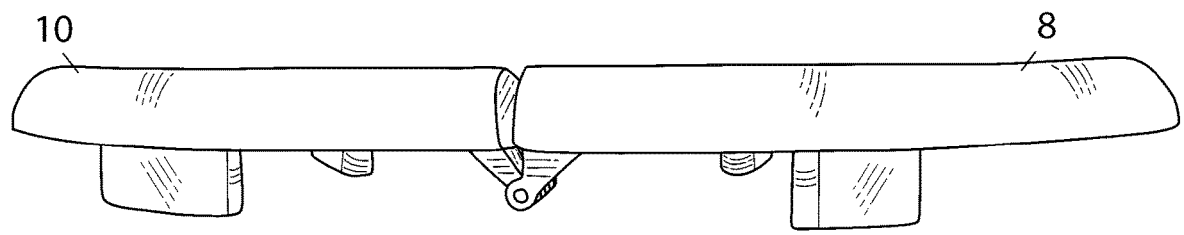
FIG. 5 is a left elevation view of an exemplary embodiment.
Figure 6:
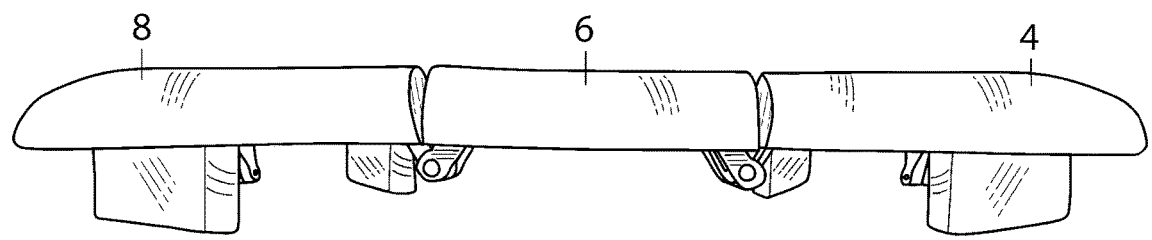
FIG. 6 is a rear elevation view of an exemplary embodiment.
Figure 7:
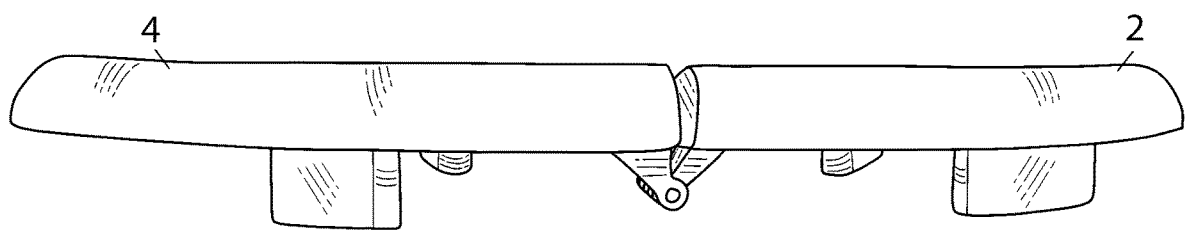
FIG. 7 is a right elevation view of an exemplary embodiment.

The same exemplary embodiment depicted in FIG. 2 and FIG. 3 is also depicted in FIG. 4 (front elevation), FIG. 5 (left elevation), FIG. 6 (rear elevation), and FIG. 7 (right elevation).

Figure 8:
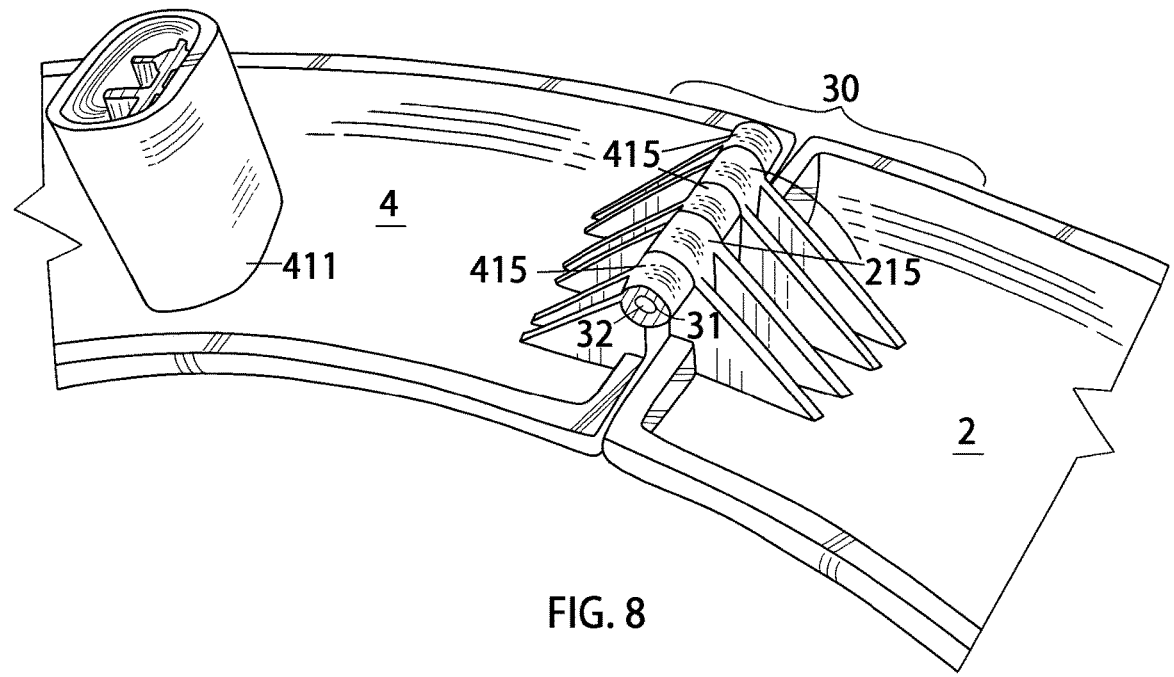
FIG. 8 is a bottom left perspective view of an exemplary embodiment of a hinge connection means connecting a right rear folding piece to a right front folding piece.

FIG. 8 illustrates an exemplary embodiment of a hinge connection means (30) connecting a right front folding piece (2) to a right rear folding piece (4) from a bottom left perspective view. The hinge connection means (30) illustrated in FIG. 8 is comprised of a plurality of raised pivot supports (215) that are structurally part of the right front folding piece (2), a plurality of raised pivot supports (415) that are structurally part of the right rear folding piece (4), and a means for pivoting (32), such as, for a non-limiting example, the hinge pin that is illustrated in FIG. 8. The structure of the plurality of raised pivot supports (215 & 415) that interfaces with and is immediately adjacent to the means for pivoting (32) is known as the pivot of the hinge (31) between the right front folding piece (2) and the right rear folding piece (4). However, the hinge connection means connecting the right front folding piece (2) to the right rear folding piece (4) could also, as a non-limiting example, be comprised of a pivot such as a living hinge, or a barrel hinge.

Figure 9:
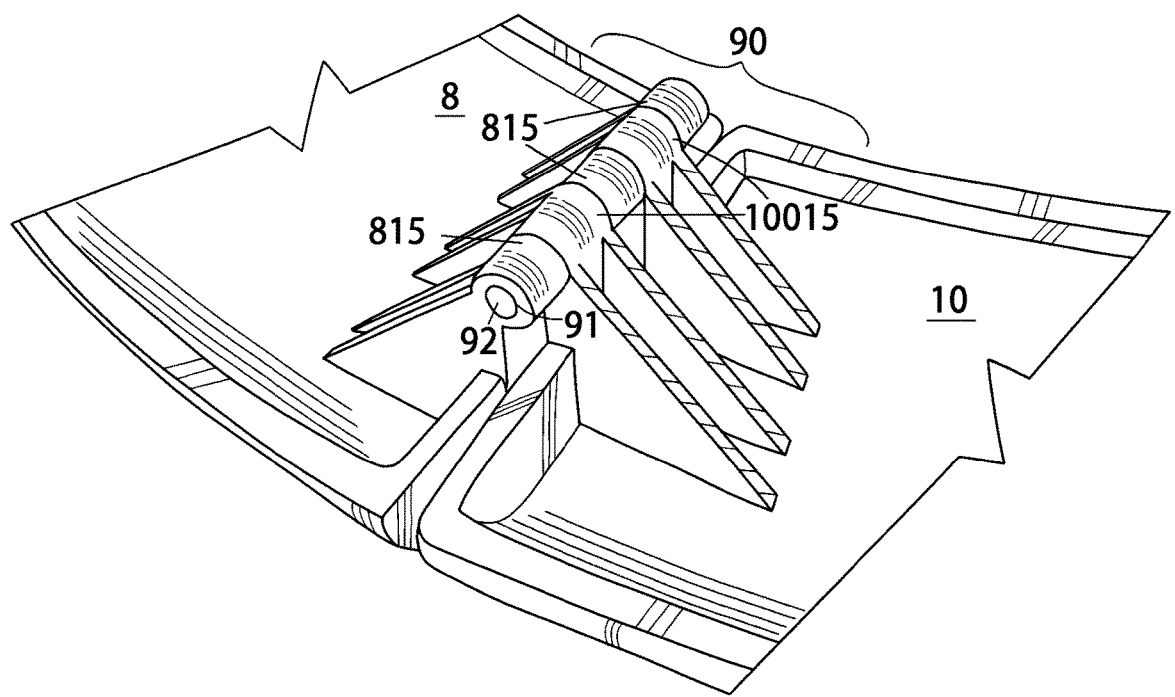
FIG. 9 is a bottom left perspective view of an exemplary embodiment of a hinge connection means connecting a left rear folding piece to a left front folding piece.

FIG. 9 illustrates an exemplary embodiment of a hinge connection means (90) connecting a left front folding piece (10) to a left rear folding piece (8) from a bottom left perspective view. The hinge connection means (90) is comprised of a plurality of raised pivot supports (10015) that are structurally part of the left front folding piece (10), a plurality of raised pivot supports (815) that are structurally part of the left rear folding piece (8), and a means for pivoting (92), such as, for a non-limiting example, the hinge pin that is illustrated in FIG. 8. The structure of the plurality of raised pivot supports (10015 & 815) that interfaces with and is immediately adjacent to the means for pivoting (92) is known as the pivot of the hinge (91) between the left front folding piece (10) and the left rear folding piece (8). However, the hinge connection means connecting the left front folding piece (10) to the left rear folding piece (8) could also, as a non-limiting example, be comprised of a pivot such as a living hinge, or a barrel hinge.

Figure 10:
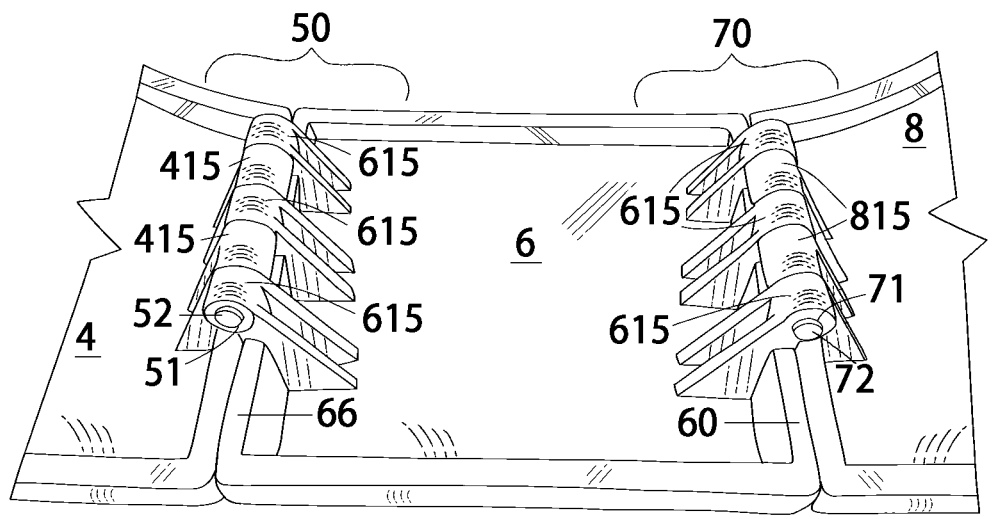
FIG. 10 is a bottom rear perspective view of exemplary embodiments of a left and right rear connecting piece and of hinge connection means that connect the left and right rear connecting piece to the right rear folding piece and the left rear folding piece.

FIG. 10 is a bottom rear perspective view of exemplary embodiments of a left and right rear connecting piece (6), of a hinge connection means (50) that connects the left and right rear connecting piece (6) to the right rear folding piece (4), and of a hinge connection means (70) that connects the left and right rear connecting piece (6) to the left rear folding piece (8). A right side (60) and a left side (66) of the left and right rear connecting piece (6) are also depicted in FIG. 10.

The exemplary embodiment illustrated in FIG. 10 discloses a hinge connection means (50) comprised of a plurality of raised pivot supports (415) that are structurally part of the right rear folding piece (4), a plurality of raised pivot supports (615) that are structurally part of a left and right rear connecting piece (6), and a means for pivoting (52), such as, for a non-limiting example, a hinge pin. The structure of the plurality of raised pivot supports (415 & 615) that interfaces with and is immediately adjacent to the means for pivoting (52) is known as the pivot of the hinge (51) between the right rear folding piece (4) and the left and right rear connecting piece (6). However, the hinge connection means connecting the left and right rear connecting piece (6) to the right rear folding piece (4) could also, as a non-limiting example, be comprised of a pivot such as a living hinge, or a barrel hinge.

The exemplary embodiment illustrated in FIG. 10 also discloses a hinge connection means (70) comprised of a plurality of raised pivot supports (815) that are structurally part of the left rear folding piece (8), a plurality of raised pivot supports (615) that are structurally part of a left and right rear connecting piece (6), and a means for pivoting (72), such as, for a non-limiting example, a hinge pin. The structure of the plurality of raised pivot supports (615 & 815) that interfaces with and is immediately adjacent to the means for pivoting (72) is known as the pivot of the hinge (71) between the left rear folding piece (8) and the left and right rear connecting piece (6). However, the hinge connection means connecting the left and right rear connecting piece (6) to the left rear folding piece (8) could also, as a non-limiting example, be comprised of a pivot such as a living hinge, or a barrel hinge.

Figure 11:
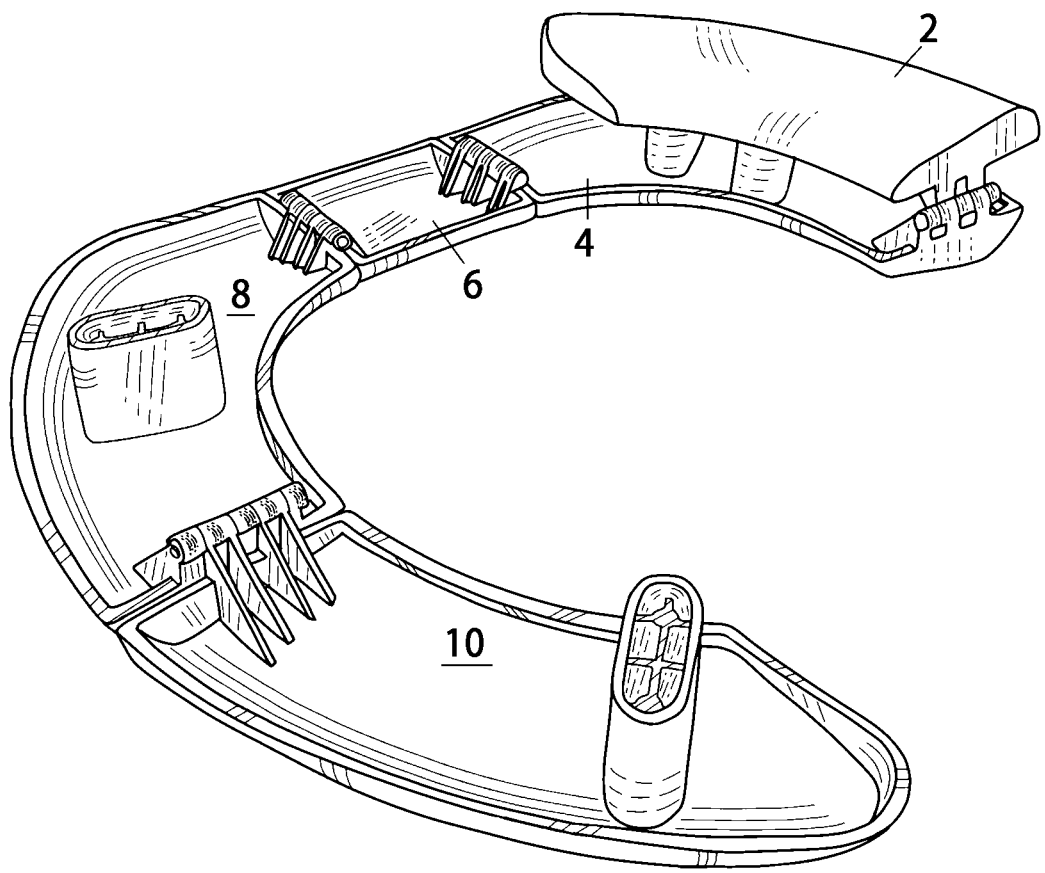
FIG. 11 is a bottom left front perspective of an exemplary embodiment showing a right front folding piece folded into a second position.

FIG. 11 is a bottom left front perspective of an exemplary embodiment showing the right front folding piece (2) folded into a second position, while the right rear folding piece (4), the left and right rear connecting piece (6), the left rear folding piece (8), and the left front folding piece (10) are all in a first position, i.e., fully deployed for the toilet seat to be sat upon.

Figure 12:
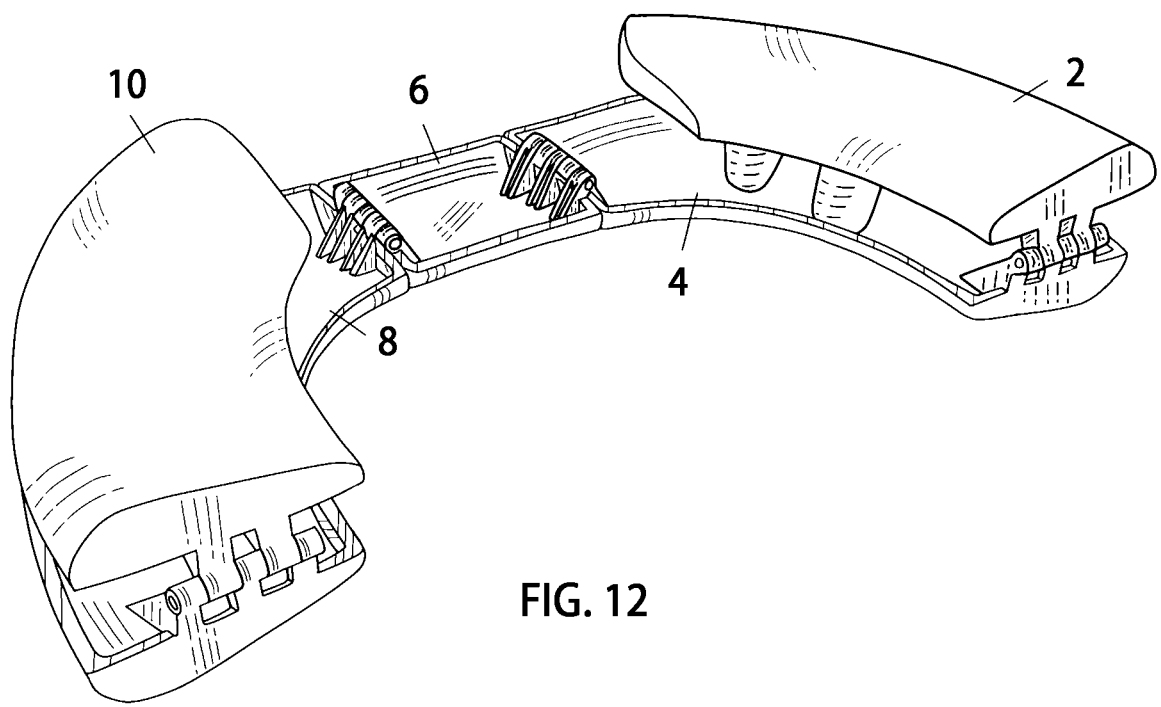
FIG. 12 is a bottom left front perspective of an exemplary embodiment showing a right front folding piece folded into a second position and a left front folding piece folded into a second position.

FIG. 12 is a bottom left front perspective of an exemplary embodiment showing a right front folding piece (2) folded into a second position and a left front folding piece (10) folded into a second position.

Figure 13:
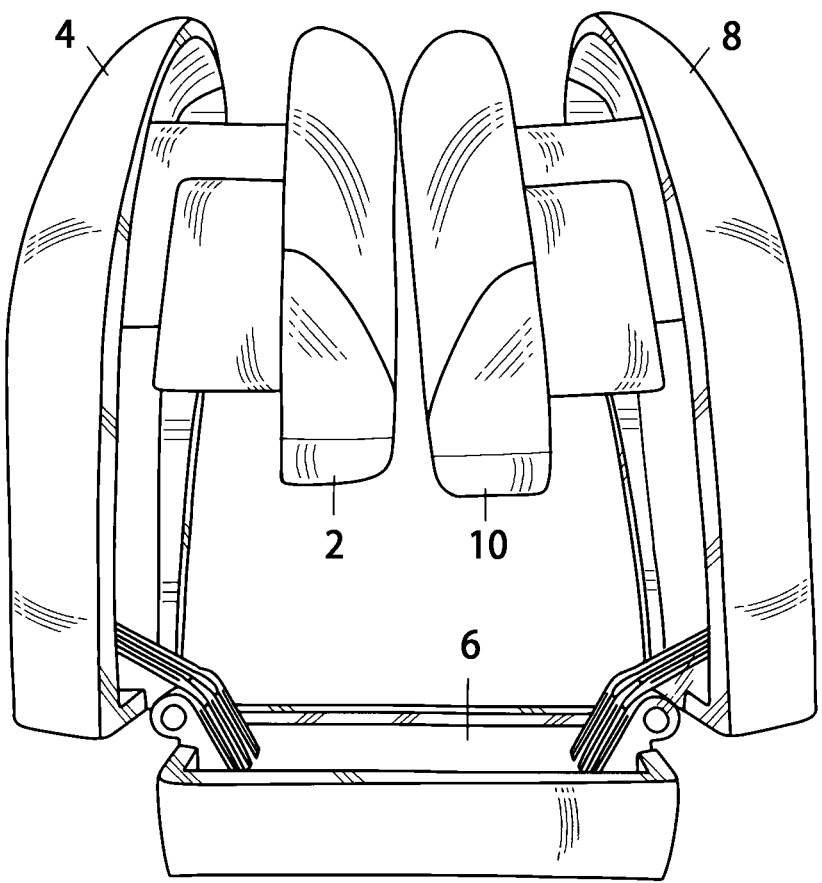
FIG. 13 is a bottom rear perspective view of an exemplary embodiment in which a right front folding piece is shown in a second position, a right rear folding piece shown in a second position, a left front folding piece is shown in a second position and a left rear piece is shown in a second position.

FIG. 13 is a bottom rear perspective view of an exemplary embodiment in which a right front folding piece (2) is shown in a second position, a right rear folding piece (4) is shown in a second position, a left front folding piece (10) is shown in a second position and a left rear piece (8) is shown in a second position; this is the same configuration that is depicted in FIG. 1 as an exemplary embodiment of a toilet seat that has been folded without pinching the user's fingers, configured in an easily portable configuration that provides a means for a user to easily grasp the entire folded seat without the need for a handle.

Figure 20:
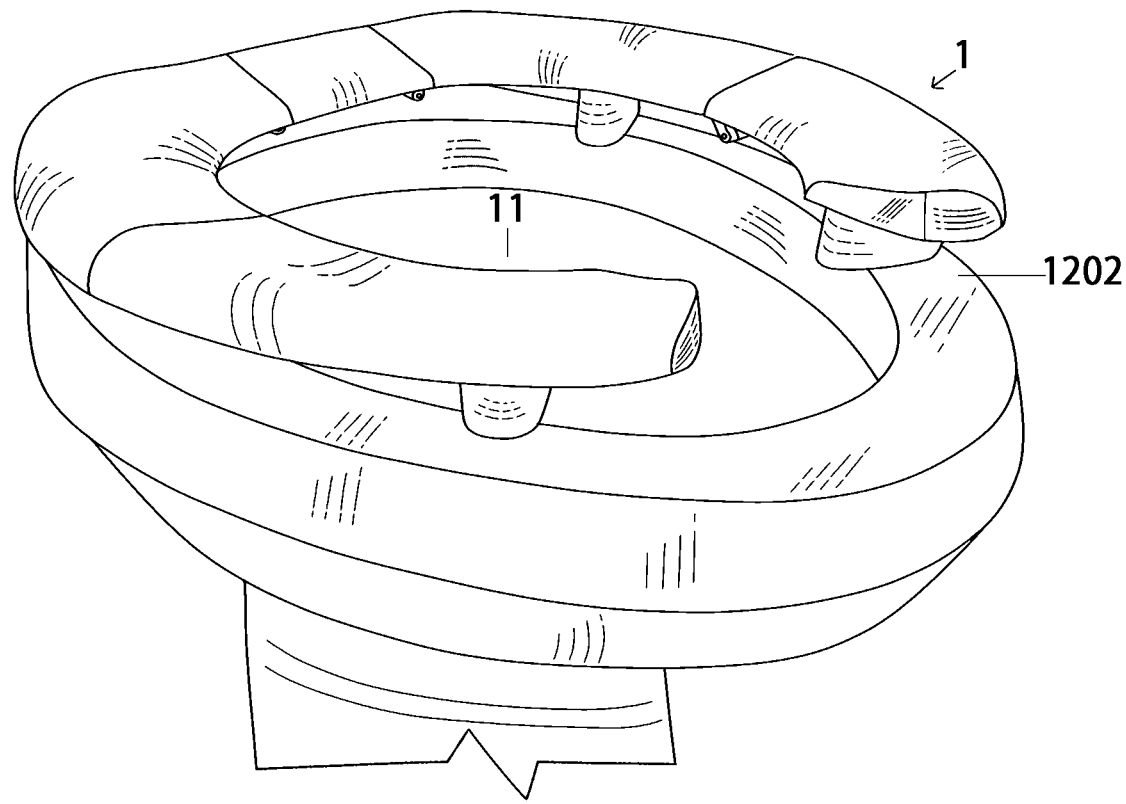
FIG. 20 is a top right perspective view of an exemplary embodiment deployed on a toilet bowl.

FIG. 20 is a top right perspective view of an exemplary embodiment of a portable foldable toilet seat (1) deployed on a toilet bowl. A central aperture (11) of the portable foldable toilet seat is also identified in FIG. 20.

Figure 21:
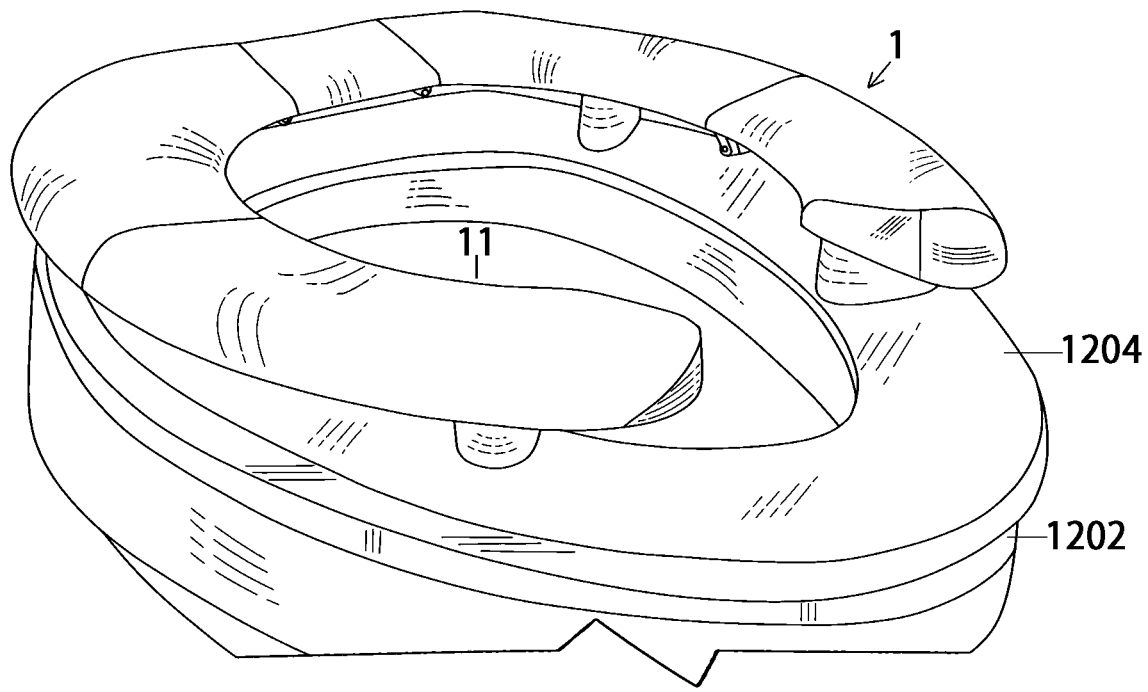
FIG. 21 is a top right perspective view of an exemplary embodiment deployed on a toilet seat.

FIG. 21 is a top right perspective view of an exemplary embodiment of a portable foldable toilet seat (1) deployed on a permanent toilet seat (1204). A central aperture (11) of the portable foldable toilet seat is also identified in FIG. 21.

Figure 22:
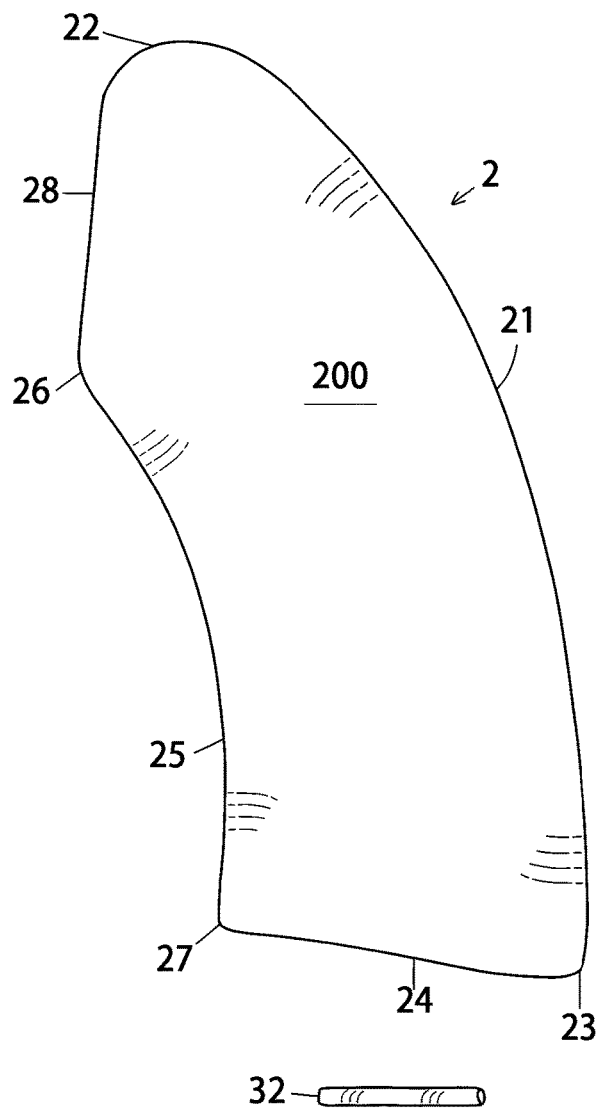
FIG. 22 is a top plan view of an exemplary embodiment of a right front folding piece.

FIG. 22 is a top plan view of an exemplary embodiment of a right front folding piece (2). That Figure depicts the right front folding piece (2) as being comprised, in part, of a right front outer perimetric surface (21) extending from an outer anterior apex (22) to an outer posterior apex (23), a right front posterior surface (24) extending from the outer posterior apex (23) to an inner posterior apex (27), a right front inner perimetric surface (25) extending from the inner posterior apex (27) to an inner anterior apex (26) and an open right front surface (28) extending from the inner anterior apex (26) to the outer anterior apex (22); and a top sitting surface (200) that constitutes the top of the right front folding piece (2). An exemplary embodiment of a means for pivoting (32) is also illustrated as a cylindrical hinge pin.

Figure 23:
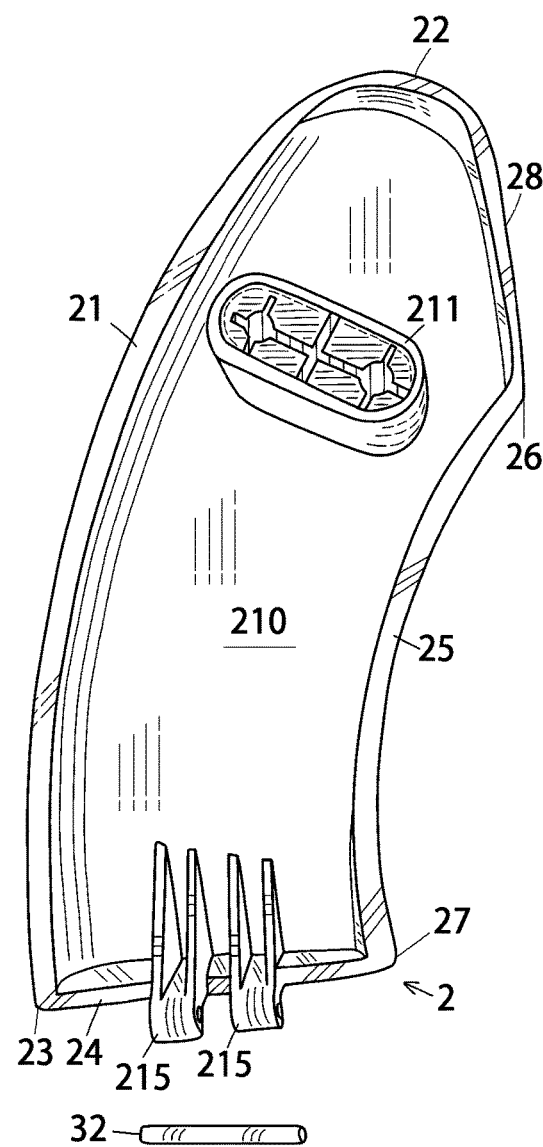
FIG. 23 is a bottom plan view of an exemplary embodiment of a right front folding piece.

FIG. 23 is a bottom plan view of an exemplary embodiment of a right front folding piece (2). That Figure depicts the right front folding piece (2) as being comprised, in part, of right front outer perimetric surface (21) extending from an outer anterior apex (22) to an outer posterior apex (23), a right front posterior surface (24) extending from the outer posterior apex (23) to an inner posterior apex (27), a right front inner perimetric surface (25) extending from the inner posterior apex (27) to an inner anterior apex (26) and an open right front surface (28) extending from the inner anterior apex (26) to the outer anterior apex (22). These elements bound the bottom surface (210) that constitutes the bottom of the right front folding piece (2). An exemplary embodiment of a means for pivoting (32) is also illustrated as a cylindrical hinge pin which would fit through the cylindrical hole in the raised pivot support (215) [said cylindrical shaped hole constituting the pivot of the hinge (31) depicted in FIG. 27] to join the right front folding piece (2) to the right rear folding piece (4) as part of the hinge connection means (30) identified in FIG. 8.

Figure 24:
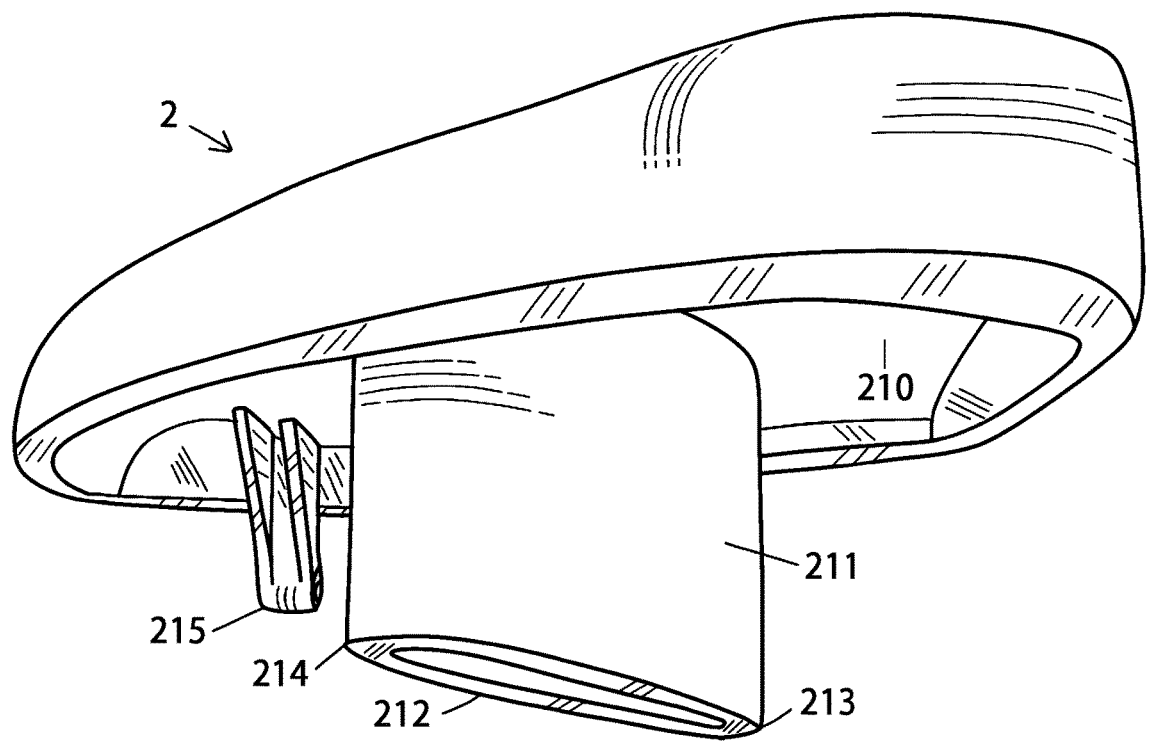
FIG. 24 is a front elevation view of an exemplary embodiment of a right front folding piece.

FIG. 24 is a front elevation view of an exemplary embodiment of a right front folding piece (2). In addition to showing the raised pivot support (215), the Figure provides detail regarding the right front stanchion (211). The exemplary embodiment of the right front stanchion (211) depicted in FIG. 24 shows a right front stanchion (211) protruding downward from the bottom surface (210) of the right front folding piece (2), the right front stanchion comprising a sloped surface (212), an inner terminus of the stanchion (213); an outer terminus of the stanchion (214); and a raised pivot support (215) protruding downward from the bottom surface of the right front folding piece at least half of the distance that the right front stanchion protrudes from the bottom surface of the right front folding piece. Although the exemplary embodiment of a right front stanchion (211) depicted in FIG. 24 is, geometrically, a stadium when viewed from a bottom plan perspective, it could be a circle, an ellipse, a square, a rectangle, or a polygon of any shape. The height of the stanchion from the bottom surface (210) is greater at the inner terminus of the stanchion (213) than at the outer terminus of the stanchion (214) in order to produce the sloped surface (212).

It is useful to have a sloped surface on the stanchions of the right front foldable piece, the right rear foldable piece, the left rear foldable piece and the left front foldable piece because when all of these pieces have sloped surfaces sloping toward the central aperture, the weight of the user will be directed partially outward from the central aperture, thereby increasing the friction between the portable foldable toilet seat and the toilet bowl or permanent toilet seat on which the portable foldable toilet seat sits, thereby making it less likely that the portable foldable toilet seat will slide around while in use.

Figure 25:
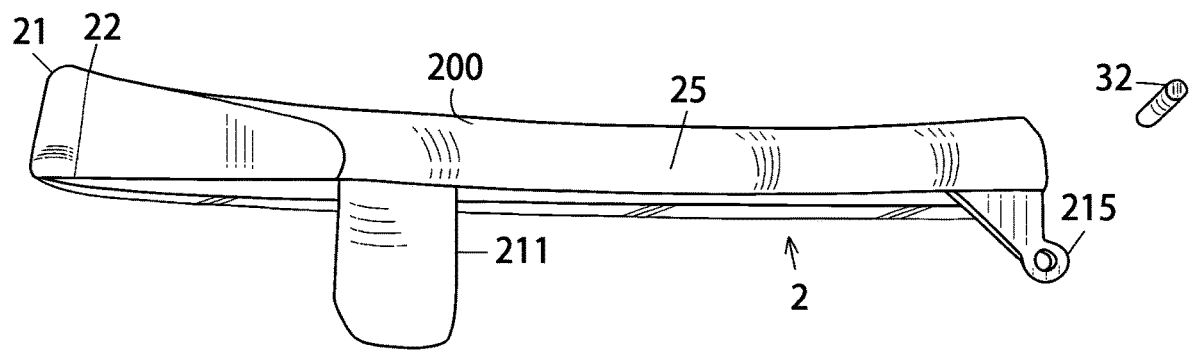
FIG. 25 is a left elevation view of an exemplary embodiment of a right front folding piece.

FIG. 25 is a left elevation view of an exemplary embodiment of a right front folding piece (2). FIG. 25 depicts a top sitting surface (200) that slopes downward toward the central aperture. The right front inner perimetric surface (25), the right front stanchion (211) and the raised pivot support (215) are also depicted, along with a raised pivot support (215) and a means for pivoting (32) which is depicted as a cylindrical hinge pin. A portion of the right front outer perimetric surface (21) is also visible in that Figure, along with the outer anterior apex (22).

Figure 26:
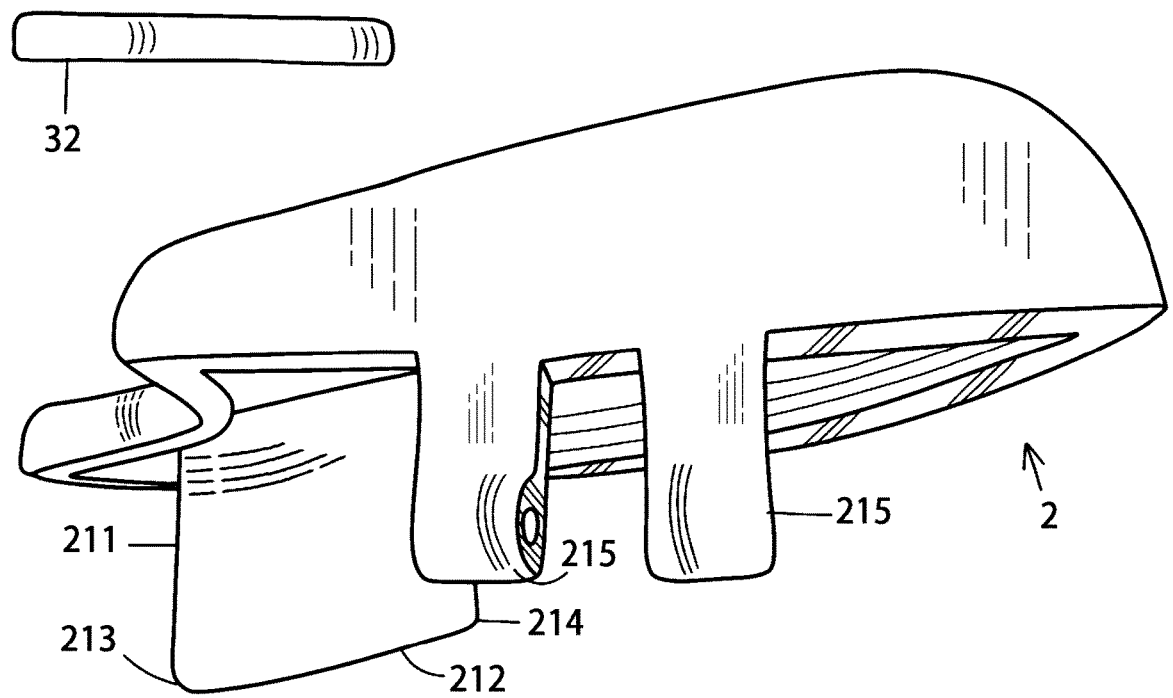
FIG. 26 is a rear elevation view of an exemplary embodiment of a right front folding piece.

FIG. 26 is a rear elevation view of an exemplary embodiment of a right front folding piece (2). A stadium-shaped right front stanchion (211) along with its inner terminus of the stanchion (213), outer terminus of the stanchion (214) and sloped surface (212) is also depicted. This Figure also depicts a plurality of raised pivot supports (215).

Figure 27:
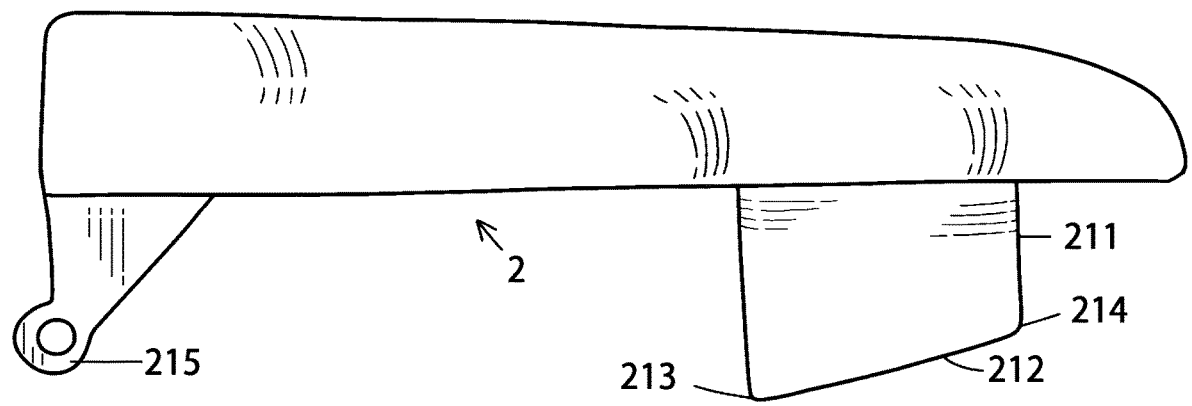
FIG. 27 is a right elevation view of an exemplary embodiment of a right front folding piece.

FIG. 27 is a right elevation view of an exemplary embodiment of a right front folding piece (2). FIG. 27 depicts one of the raised pivot supports (215) and the pivot of the hinge (31) that is defined thereby. The stadium-shaped right front stanchion (211) along with its inner terminus of the stanchion (213), outer terminus of the stanchion (214) and sloped surface (212) is also depicted.

FIG. 28 is a top plan view of an exemplary embodiment of a right rear folding piece. FIG. 28 depicts the right rear folding piece (4) as being comprised, in part, of a right rear outer perimetric surface (41) extending from an outer anterior apex (42) to an outer posterior apex (43); a right rear connecting surface (44) extending from the outer posterior apex (43) to an inner posterior apex (47); a right rear inner perimetric surface (45) extending from the inner posterior apex (47) to an inner anterior apex (46) and an anterior surface (49) extending from the inner anterior apex (46) to the outer anterior apex (42). A top sitting surface (400) and a plurality of raised pivot supports (415) are also depicted in FIG. 28.

FIG. 29 is a bottom plan view of an exemplary embodiment of a left rear folding piece (4). FIG. 29 depicts the right rear folding piece (4) as being comprised, in part, of a right rear outer perimetric surface (41) extending from an outer anterior apex (42) to an outer posterior apex (43), a right rear connecting surface (44) extending from the outer posterior apex (43) to an inner posterior apex (47), a right rear inner perimetric surface (45) extending from the inner posterior apex (47) to an inner anterior apex (46) and an anterior surface (49) extending from the inner anterior apex (46) to the outer anterior apex (42). These elements bound the bottom surface (410) that constitutes the bottom of the right rear folding piece (4). The Figure also depicts a plurality of the raised pivot supports (415) and a right rear stanchion (411). FIG. 29, along with FIG. 30, further discloses the right rear connecting surface (44) as comprising a raised pivot support (415) protruding downward from a bottom surface (410) on the right rear connecting surface (44).

FIG. 30 is a front elevation view of an exemplary embodiment of a right rear folding piece (4). FIG. 30 depicts the following features which partly comprise the right rear front folding piece: an anterior surface (49), an outer anterior apex (42), a top sitting surface (400), a right rear inner perimetric surface (45), an inner posterior apex (47), a plurality of raised pivot supports (415) and a right rear stanchion (411), as well as that stanchion's sloped surface (412) and the inner terminus of the stanchion (413).

Figure 31:
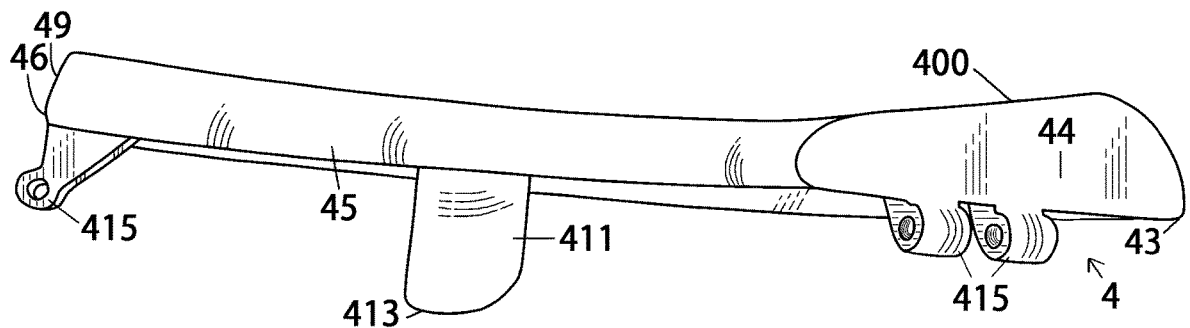
FIG. 31 is a left elevation view of an exemplary embodiment of a right rear folding piece.

FIG. 31 is a left elevation view of an exemplary embodiment of a right rear folding piece (4). FIG. 31 depicts the right rear connecting surface (44), an outer posterior apex (43), the right rear inner perimetric surface (45), the inner anterior apex (46), the anterior surface (49), a plurality of raised pivot supports (415) and the right rear stanchion (411), as well as the inner terminus of the stanchion (413).

Figure 32:
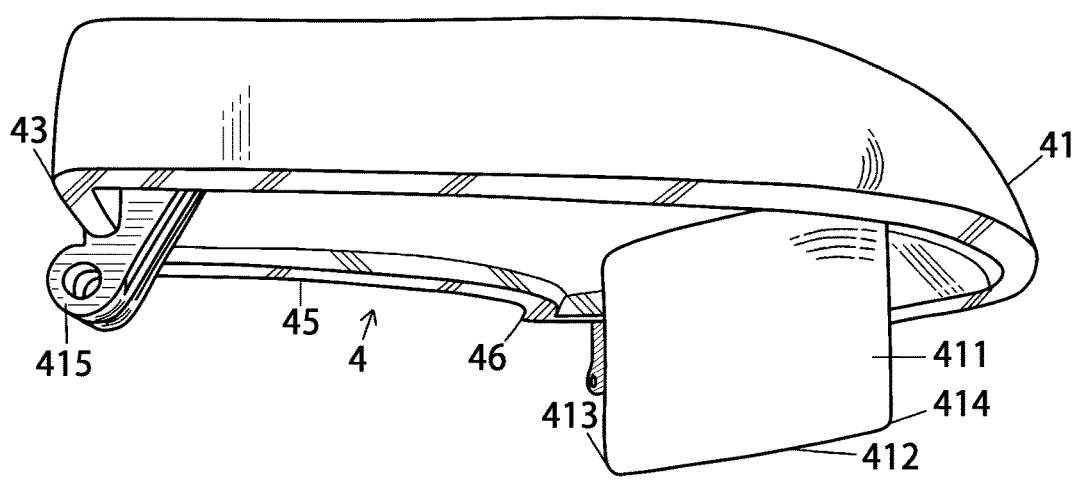
FIG. 32 is a rear elevation view of an exemplary embodiment of a right rear folding piece.

FIG. 32 is a rear elevation view of an exemplary embodiment of a right rear folding piece (4). FIG. 32 depicts the outer posterior apex (43), the right rear outer perimetric surface (41), the inner anterior apex (46), the right rear inner perimetric surface (45), a plurality of raised pivot supports (415) and the right rear stanchion (411), as well as the sloped surface (412) that links the inner terminus of the stanchion (413) to the outer terminus of the stanchion (414).

Figure 33:
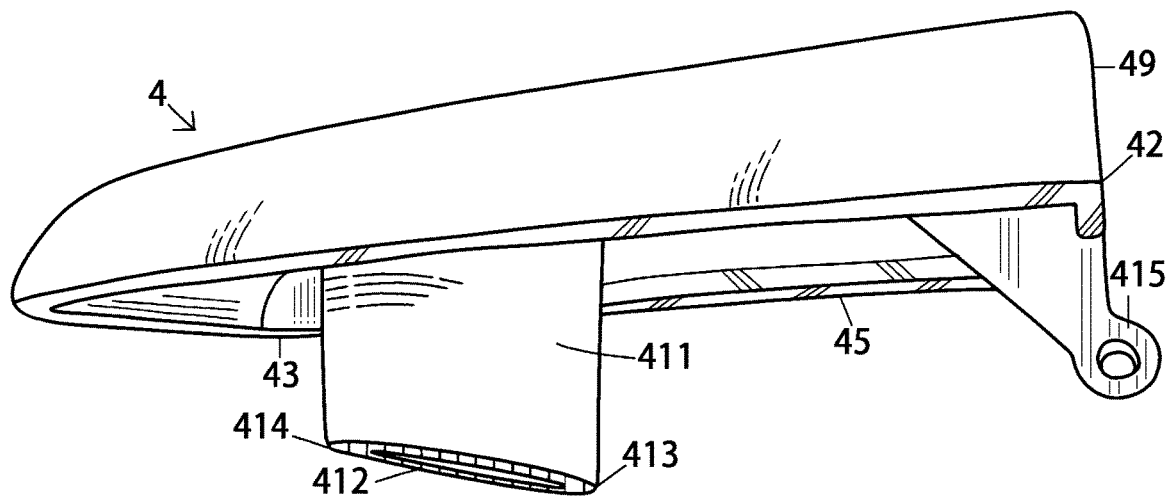
FIG. 33 is a right elevation view of an exemplary embodiment of a right rear folding piece.

FIG. 33 is a right elevation view of an exemplary embodiment of a right rear folding piece (4). FIG. 33 depicts the outer anterior apex (42), the anterior surface (49), the right rear inner perimetric surface (45), a raised pivot support (415), a right rear stanchion (411), inner terminus of the stanchion (413) and the outer terminus of the stanchion (414) that are linked by that stanchion's sloped surface (412).

FIG. 34 is a top plan view of an exemplary embodiment of a left and right rear connecting piece (6). FIG. 34 depicts the following features of the left and right rear connecting piece: a right side (60) that extends from a right anterior apex (61) to a right posterior apex (62); an anterior side (63) that extends from the right anterior apex (61) to a left anterior apex (64); a left side (66) that extends from the left anterior apex (64) to a left posterior apex (65); a posterior side (67) that extends from the right posterior apex (62) to the left posterior apex (65); a plurality of raised pivot supports (615); and a top sitting surface (600).

FIG. 35 is a bottom plan view of an exemplary embodiment of a left and right rear connecting piece (6). FIG. 35 depicts the left and right rear connecting piece as having a bottom surface (610) surrounded by: a right side (60) extending from a right anterior apex (61) to a right posterior apex (62); an anterior side (63) extending from the right anterior apex (61) to a left anterior apex (64); a left side (66) extending from the left anterior apex (64) to a left posterior apex (65); and a posterior side (67) extending from the right posterior apex (62) to the left posterior apex (65). Both the right side and the left side of the left and right rear connecting piece (6) are shown as possessing a plurality of raised pivot supports (615).

FIG. 36 is a front elevation view of an exemplary embodiment of a left and right rear connecting piece (6). FIG. 36 depicts the following features on the left and right rear connecting piece (6): a top sitting surface (600); an anterior side (63) extending from a right anterior apex (61) to a right posterior apex (62); and a plurality of raised support pivots (615).

FIG. 37 is a left elevation view of an exemplary embodiment of a left and right rear connecting piece (6). FIG. 37 depicts the following features on the left and right rear connecting piece (6): a left side (66); a top sitting surface (600); a left side (66) extending from a left anterior apex (64) to a left posterior apex (65); and a plurality of raised support pivots (615).

Figure 38:
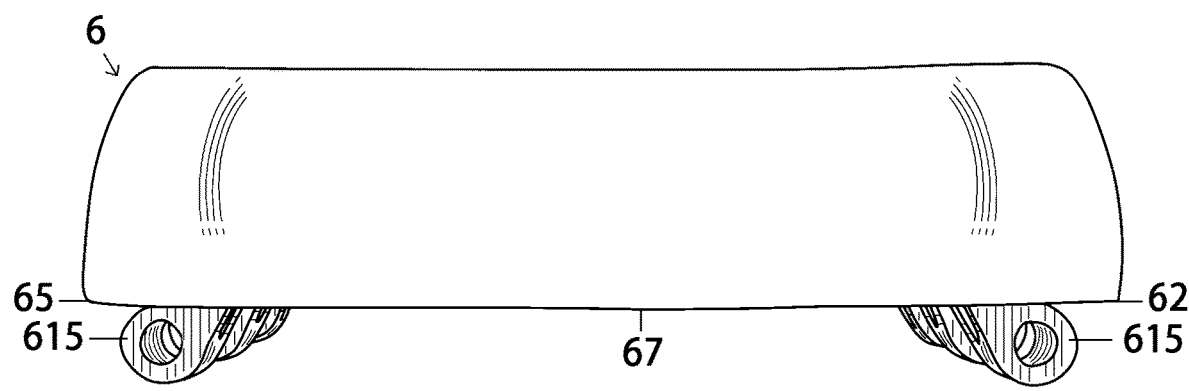
FIG. 38 is a rear elevation view of an exemplary embodiment of a left and right rear connecting piece.

FIG. 38 is a rear elevation view of an exemplary embodiment of a left and right rear connecting piece. FIG. 38 depicts the following features on the left and right rear connecting piece (6): a posterior side (67) extending from a right posterior apex (62) to a left posterior apex (65); and a plurality of raised support pivots (615).

Figure 39:
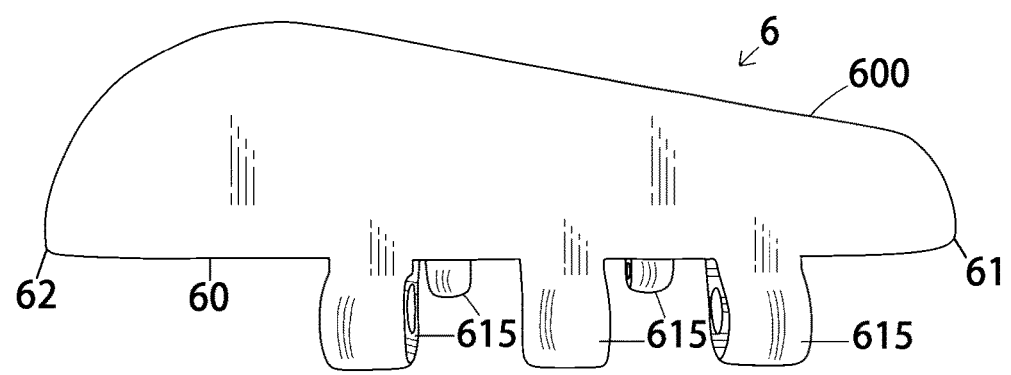
FIG. 39 is a right elevation view of an exemplary embodiment of a left and right rear connecting piece.

FIG. 39 is a right elevation view of an exemplary embodiment of a left and right rear connecting piece. FIG. 39 depicts the following features on the left and right rear connecting piece (6): a top sitting surface (600); a right side (60) extending from a right anterior apex (61) to a right posterior apex (62); and a plurality of raised support pivots (615).

FIGS. 35-39 further disclose an embodiment which is comprised of a raised pivot support (615) protruding downward from the right side (60); and a raised pivot support (615) protruding downward from the left side (66).

FIG. 40 is a top plan view of an exemplary embodiment of a left rear folding piece (8). FIG. 28 depicts the left rear folding piece (8) as being comprised, in part, of a left rear outer perimetric surface (81) extending from an outer anterior apex (82) to an outer posterior apex (83); a left rear connecting surface (84) extending from the outer posterior apex (83) to an inner posterior apex (87); a left rear inner perimetric surface (85) extending from the inner posterior apex (87) to an inner anterior apex (86); and an anterior surface (89) extending from the inner anterior apex (86) to the outer anterior apex (82). A top sitting surface (800) and a plurality of raised pivot supports (815) are also depicted in FIG. 28.

FIG. 41 is a bottom plan view of an exemplary embodiment of a left rear folding piece (8). FIG. 41 depicts the left rear folding piece (8) as being comprised, in part, of a left rear outer perimetric surface (81) extending from an outer anterior apex (82) to an outer posterior apex (83), a left rear connecting surface (84) extending from the outer posterior apex (83) to an inner posterior apex (87), a left rear inner perimetric surface (85) extending from the inner posterior apex (87) to an inner anterior apex (86) and an anterior surface (89) extending from the inner anterior apex (86) to the outer anterior apex (82). These elements bound the bottom surface (810) that constitutes the bottom of the left rear folding piece (8). The Figure also depicts a plurality of the raised pivot supports (815) and a left rear stanchion (811). FIG. 41, along with FIG. 42, further discloses the left rear connecting surface (84) comprising a raised pivot support (815) protruding downward from a bottom surface (810) on the left rear connecting surface (84).

FIG. 42 is a front elevation view of an exemplary embodiment of a left rear folding piece (8). FIG. 42 depicts the following features which partly comprise the left rear front folding piece: an anterior surface (89), an outer anterior apex (82), a top sitting surface (800), a left rear inner perimetric surface (85) extending from the inner anterior apex (86) to an inner posterior apex (87), a plurality of raised pivot supports (815) and a left rear stanchion (811), as well as that stanchion's sloped surface (812) and the inner terminus of the stanchion (813).

FIG. 43 is a left elevation view of an exemplary embodiment of a left rear folding piece (8). FIG. 43 depicts the left rear connecting surface (84), an outer posterior apex (83), the left rear inner perimetric surface (85), the left rear outer perimetric surface (81) that runs from the outer anterior apex (82) to the outer posterior apex (83), the anterior surface (89), a plurality of raised pivot supports (815) and the left rear stanchion (811), as well as a sloped surface (812) that connects the inner terminus of the stanchion (813) to the outer terminus of the stanchion (814).

Figure 44:
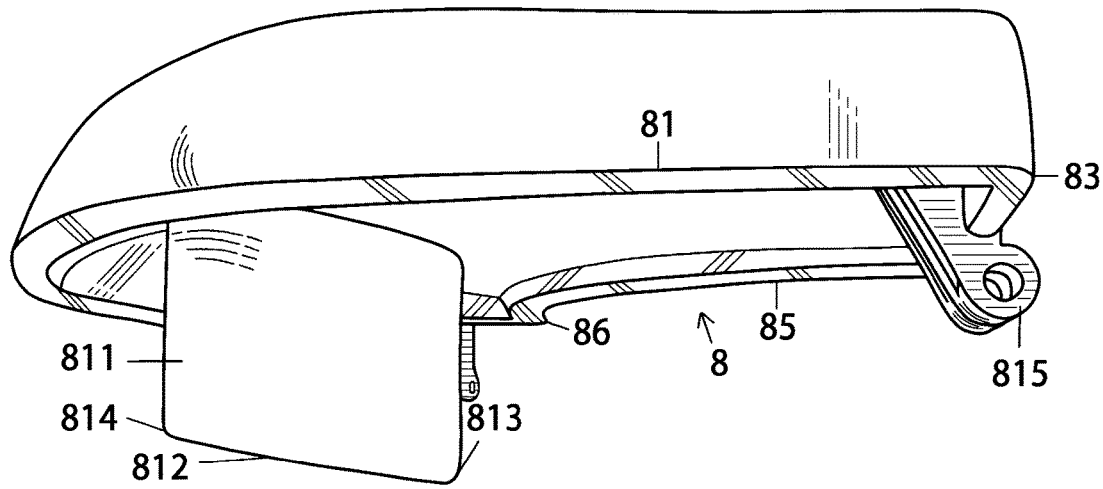
FIG. 44 is a rear elevation view of an exemplary embodiment of a left rear folding piece.

FIG. 44 is a rear elevation view of an exemplary embodiment of a left rear folding piece (8). FIG. 44 depicts the outer posterior apex (83), the left rear outer perimetric surface (81), the inner anterior apex (86), the left rear inner perimetric surface (85), a plurality of raised pivot supports (815) and the right rear stanchion (811), as well as the sloped surface (812) that links the inner terminus of the stanchion (813) to the outer terminus of the stanchion (814).

Figure 45:
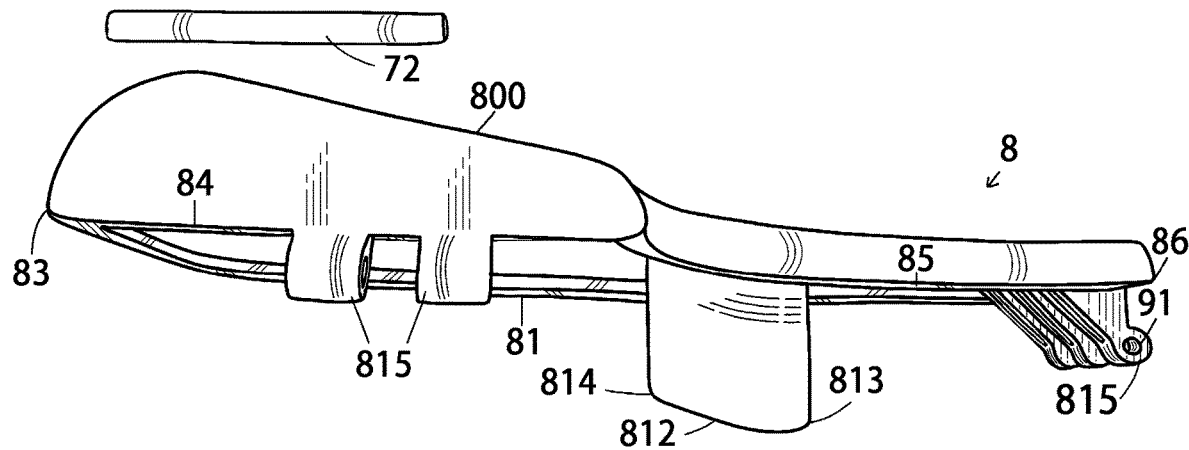
FIG. 45 is a right elevation view of an exemplary embodiment of a left rear folding piece.

FIG. 45 is a right elevation view of an exemplary embodiment of a left rear folding piece (8). FIG. 45 depicts the left rear inner perimetric surface (85) that extends from the inner anterior apex (86) to the inner posterior apex (87), the left rear connecting surface (84) that extends from the outer posterior apex (83) to the inner posterior apex (87), a plurality of raised pivot supports (815), a left rear stanchion (811), an inner terminus of the stanchion (813) and an outer terminus of the stanchion (814) that are linked by that stanchion's sloped surface (812). FIG. 45 further shows a means for pivoting (72) which is depicted as a cylindrical hinge pin that would fit through any of the holes depicted in the raised pivot supports (815).

Figure 46:
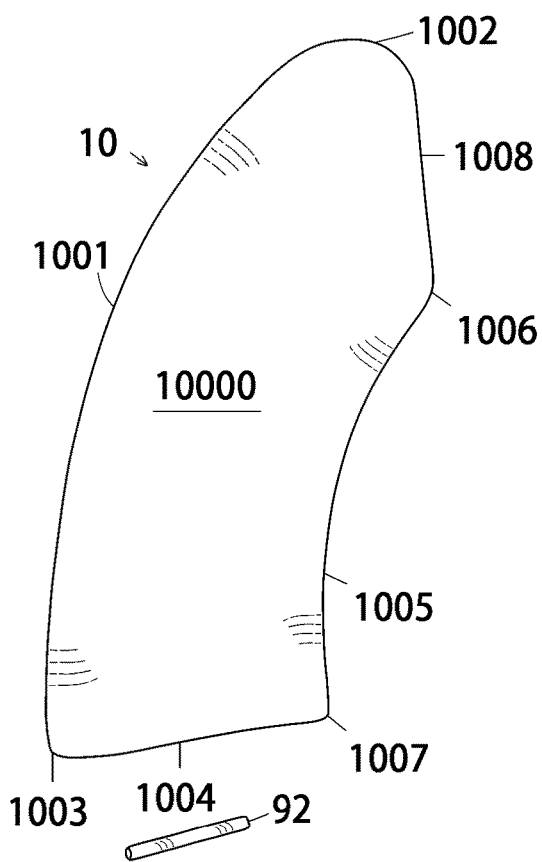
FIG. 46 is a top plan elevation view of an exemplary embodiment of a left front folding piece.

FIG. 46 is a top plan elevation view of an exemplary embodiment of a left front folding piece (10). FIG. 46 depicts the left front folding piece (10) as being comprised, in part, of a left front outer perimetric surface (1001) extending from an outer anterior apex (1002) to an outer posterior apex (1003), a left front posterior surface (1004) extending from the outer posterior apex (1003) to an inner posterior apex (1007), a left front inner perimetric surface (1005) extending from the inner posterior apex (1007) to an inner anterior apex (1006) and an open left front surface (1008) extending from the inner anterior apex (1006) to the outer anterior apex (1002); and a top sitting surface (10000) that constitutes the top of the left front folding piece (10). An exemplary embodiment of a means for pivoting (92) is also illustrated as a cylindrical hinge pin.

Figure 47:
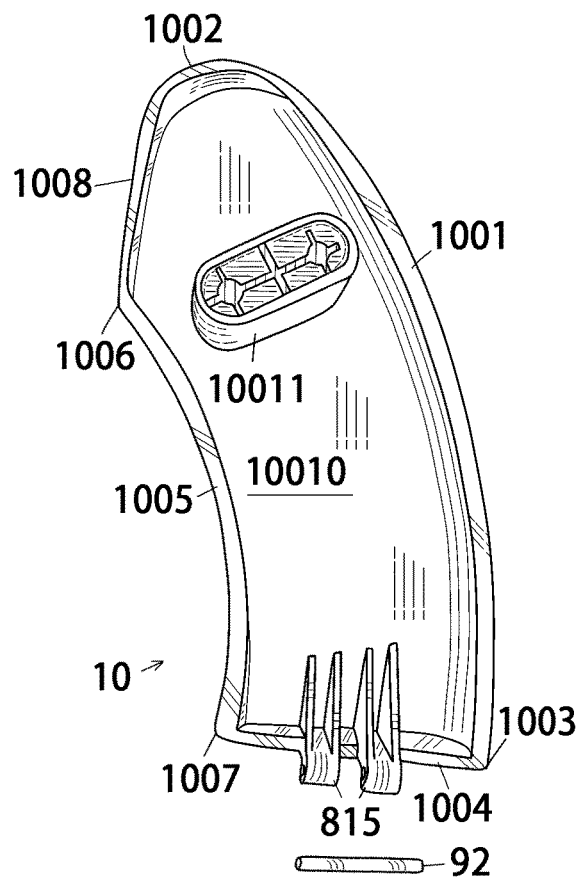
FIG. 47 is a bottom plan elevation view of an exemplary embodiment of a left front folding piece.

FIG. 47 is a bottom plan elevation view of an exemplary embodiment of a left front folding piece (10). FIG. 47 depicts the left front folding piece (10) as being comprised, in part, of a left front outer perimetric surface (1001) extending from an outer anterior apex (1002) to an outer posterior apex (1003), a left front posterior surface (1004) extending from the outer posterior apex (1003) to an inner posterior apex (1007), a right front inner perimetric surface (1005) extending from the inner posterior apex (1007) to an inner anterior apex (1006) and an open left front surface (1008) extending from the inner anterior apex (1006) to the outer anterior apex (1002). These elements bound the bottom surface (10010) that constitutes the bottom of the left front folding piece (10). An exemplary embodiment of a means for pivoting (92) is also illustrated as a cylindrical hinge pin which would fit through the cylindrical hole in the raised pivot support (10015) [said cylindrical shaped hole constituting the pivot of the hinge (91) depicted in FIG. 45] to join the left front folding piece (10) to the left rear folding piece (8) as part of the hinge connection means (90) identified in FIG. 9.

Figure 48:
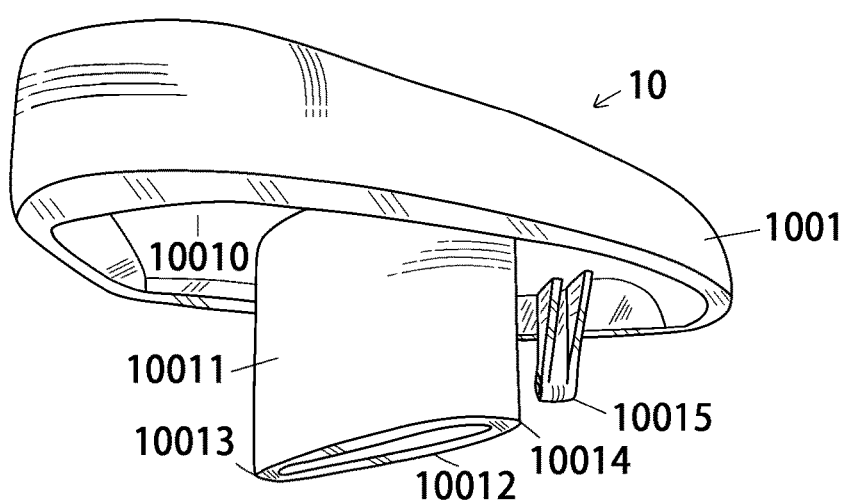
FIG. 48 is a front elevation view of an exemplary embodiment of a left front folding piece.

FIG. 48 is a front elevation view of an exemplary embodiment of a left front folding piece (10). In addition to showing the raised pivot support (10015), the Figure provides detail regarding the left front stanchion (10011). The exemplary embodiment of the left front stanchion (10011) depicted in FIG. 48 shows a left front stanchion (10011) protruding downward from the bottom surface (10010) of the left front folding piece (10), the left front stanchion comprising a sloped surface (10012), an inner terminus of the stanchion (10013); an outer terminus of the stanchion (10014); and a raised pivot support (10015) protruding downward from the bottom surface of the left front folding piece at least half of the distance that the left front stanchion protrudes from the bottom surface of the left front folding piece. Although the exemplary embodiment of a left front stanchion (10011) depicted in FIG. 48 is, geometrically, a stadium when viewed from a bottom plan perspective, it could be a circle, an ellipse, a square, a rectangle, or a polygon of any shape. The height of the stanchion from the bottom surface (10010) is greater at the inner terminus of the stanchion (10013) than at the outer terminus of the stanchion (10014) in order to produce the sloped surface (10012).

It is useful to have a sloped surface on the stanchions of the right front foldable piece, the right rear foldable piece, the left rear foldable piece and the left front foldable piece because when all of these pieces have sloped surfaces sloping toward the central aperture, the weight of the user will be directed partially outward from the central aperture, thereby increasing the friction between the portable foldable toilet seat and the toilet bowl or permanent toilet seat on which the portable foldable toilet seat sits, thereby making it less likely that the portable foldable toilet seat will slide around while in use.

Figure 49:
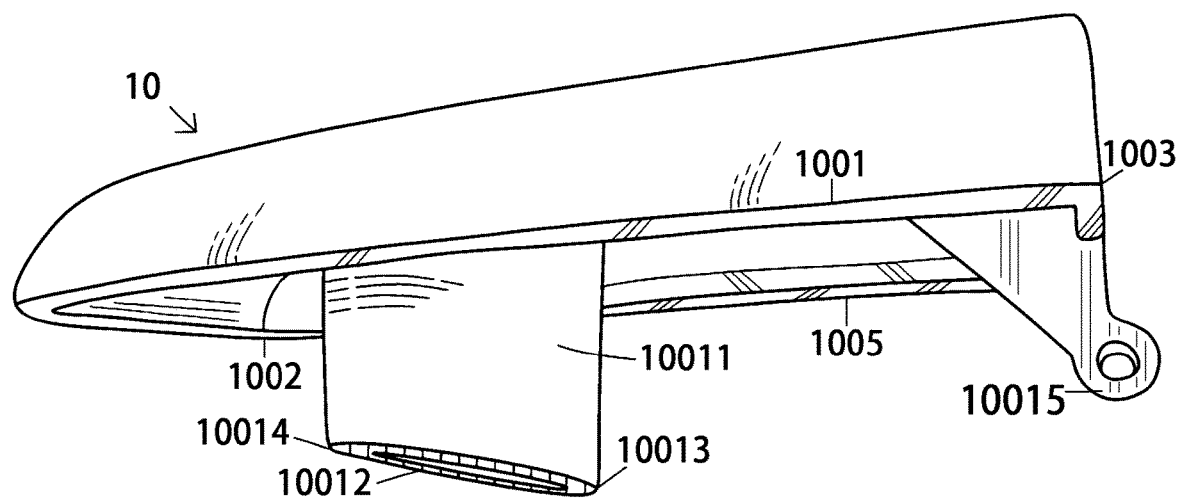
FIG. 49 is a left elevation view of an exemplary embodiment of a left front folding piece.

FIG. 49 is a left elevation view of an exemplary embodiment of a left front folding piece. FIG. 49 depicts a left front inner perimetric surface (1005), the raised pivot support (10015); the left front stanchion (10011), the inner terminus of the stanchion (10013), the outer terminus of the stanchion (10014) and the sloped surface (10012) extending between the two terminuses are also depicted. The left front outer perimetric surface (1001) is also visible in that Figure, extending from an outer anterior apex (1002 to an outer posterior apex (1003).

Figure 50:
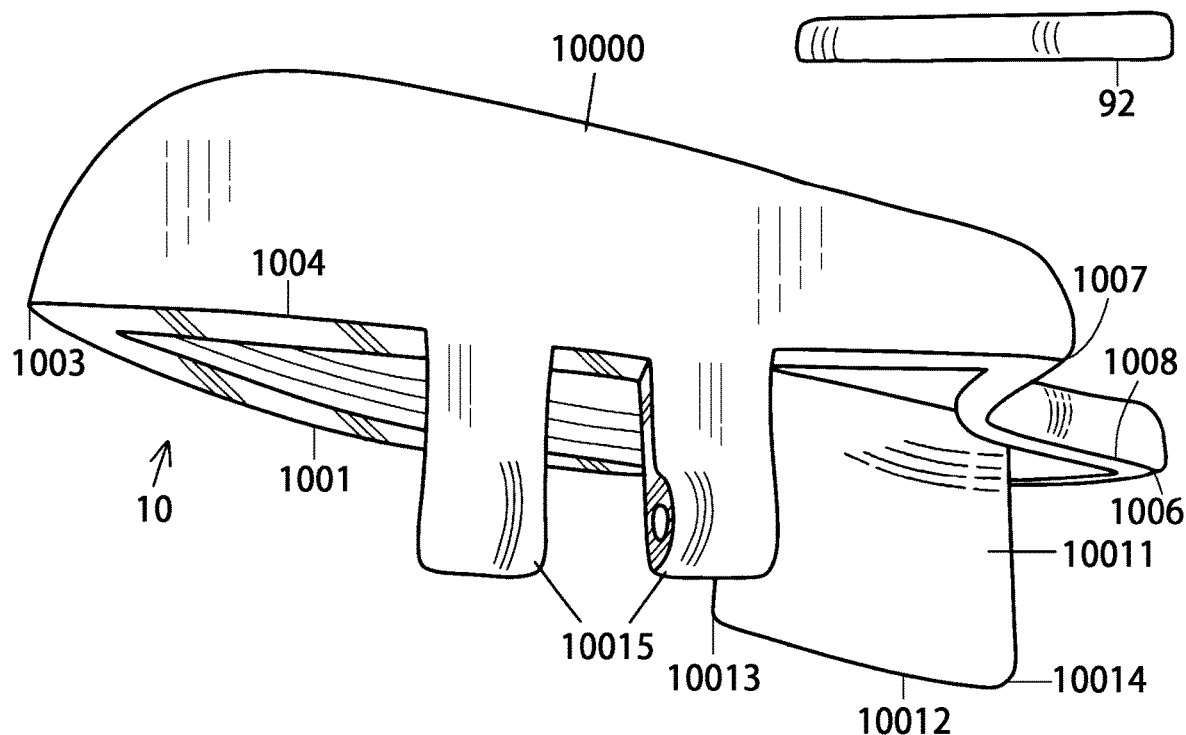
FIG. 50 is a rear elevation view of an exemplary embodiment of a left front folding piece.

FIG. 50 is a rear elevation view of an exemplary embodiment of a left front folding piece. A stadium-shaped left front stanchion (1011) along with its inner terminus of the stanchion (10013), outer terminus of the stanchion (10014) and sloped surface (10012) is also depicted. This Figure also depicts a plurality of raised pivot supports (10015). Other elements visible in this Figure are the open left front surface (1008) extending from the inner anterior apex (1006) to the inner posterior apex (1007), the left front outer perimetric surface (1001) and the left front posterior surface (1004) extending from the outer posterior apex (1003) to the inner posterior apex (1007). An exemplary embodiment of a means for pivoting (92) is also illustrated as a cylindrical hinge pin which would fit through the cylindrical hole in the raised pivot support (10015) [said cylindrical shaped hole constituting the pivot of the hinge (91) depicted in FIG. 45] to join the left front folding piece (10) to the left rear folding piece (8) as part of the hinge connection means (90) identified in FIG. 9.

Figure 51:
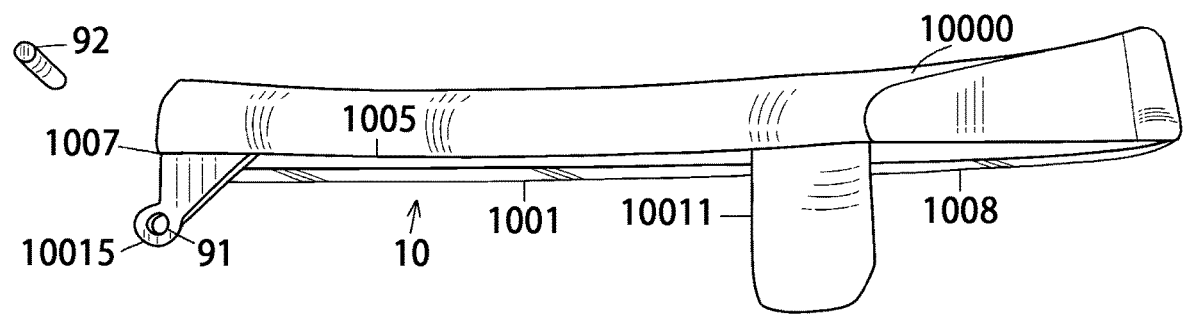
FIG. 51 is a right elevation view of an exemplary embodiment of a left front folding piece.

FIG. 51 is a right elevation view of an exemplary embodiment of a left front folding piece. FIG. 27 depicts one of the raised pivot supports (10015) and the pivot of the hinge (91) that is defined thereby. The stadium-shaped left front stanchion (10011) is also depicted, along with the left front outer perimetric surface (1001), the left front inner perimetric surface (1005), the inner posterior apex (1007), the open left front surface (1008) and the top sitting surface (10000).

Second Exemplary Embodiment: An Anti-Viral, Anti-Bacterial and Anti-Fungal Toilet Seat Made of One Piece that is Resistant to Algae, Mold and Mildew and that Can Be Safely Folded and Held without the Danger of Pinched Fingers In another exemplary embodiment, it is possible to construct the apparatus described in the First Exemplary Embodiment in a single piece using living hinges to link the following elements that are shown in FIG. 19: the right front folding piece (2) to the right rear folding piece (4), the right rear folding piece (4) to the left and right rear connecting piece (6), the left and right rear connecting piece (6) to the left rear folding piece (8) and the left rear folding piece (8) to the left front folding piece (10).

When one piece construction is used and the portable foldable toilet seat is constructed using the metal ion chemistry described in the First Exemplary Embodiment, all elements of the portable foldable toilet seat will possess anti-viral, anti-bacterial and anti-fungal properties and will be resistant to algae, mold and mildew.

Figure 19:
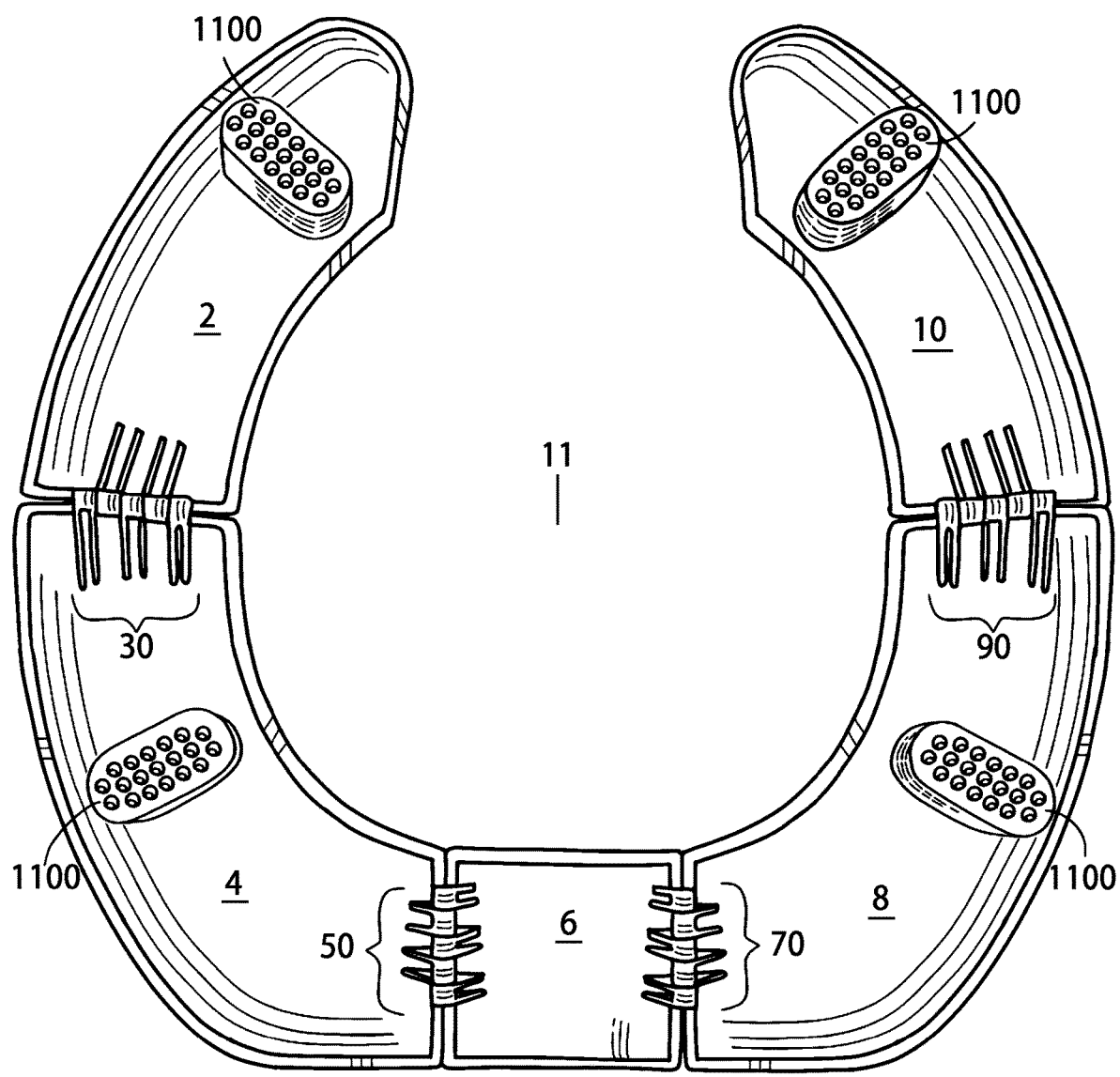
FIG. 19 is a bottom plan view of an exemplary embodiment showing exemplary embodiments of tractive pad members fitted over exemplary embodiments of a right front stanchion, a left front stanchion, a right rear stanchion and a left front stanchion; this Figure also depicts a right rear folding piece in a first position, a left rear folding piece in a first position, a right front folding piece in a first position and a left front folding piece in a first position.

In the Second Exemplary Embodiment, the hinge connection means (30, 50, 70 & 80) depicted in FIG. 19 consist of living hinges. The structures depicted in FIGS. 8 and 9 (the raised pivot supports) remain raised in the Second Exemplary Embodiment, but a living hinge is used as the means for pivoting instead of the cylindrical hinge pin that is shown depicted in FIGS. 8 and 9. In the Second Exemplary Embodiment, the structures depicted as raised pivot supports in FIG. 10 may, but need not be, raised above the plane formed by the lowest point of the right side (60) and the left side (66) of the left and right rear connecting piece (6).

Figure 52:
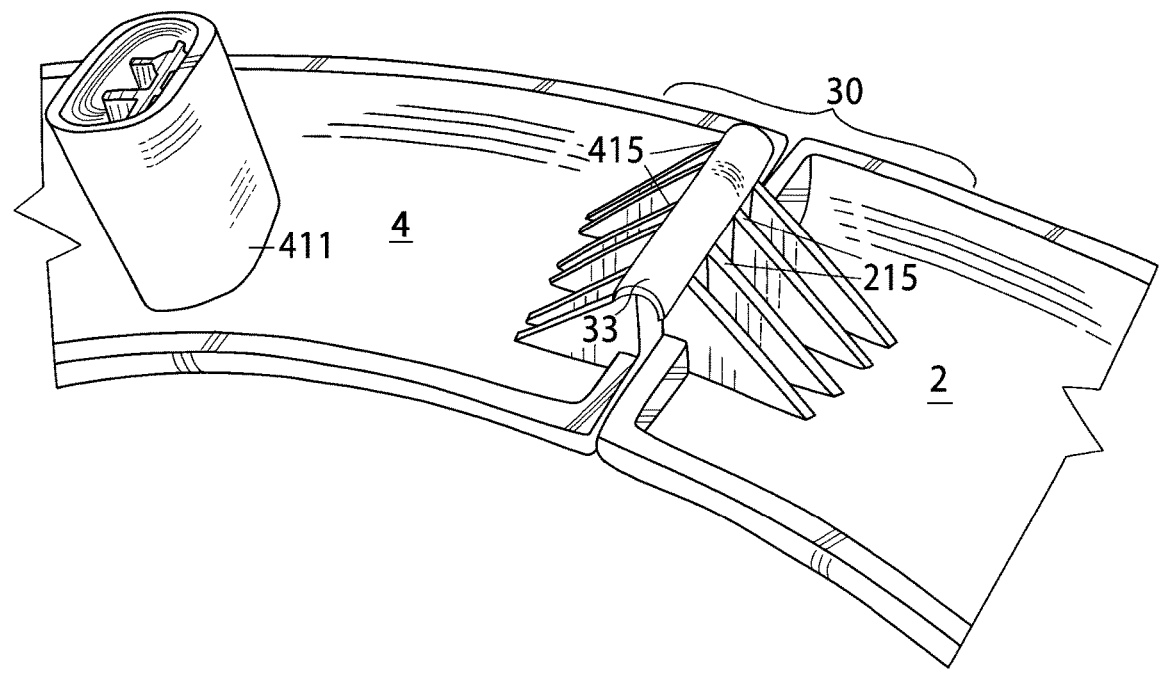
FIG. 52 is a bottom left perspective view of an exemplary embodiment of a living hinge as a hinge connection means connecting a right rear folding piece to a right front folding piece.

FIG. 52 is a bottom left perspective view of an exemplary embodiment of a living hinge (33) as a hinge connection means (30) connecting a right rear folding piece (4) to a right front folding piece (2). FIG. 52 discloses a right front folding piece (2) and a right rear folding piece (4) that are connected via a hinge connection means (30) that is depicted as a living hinge (33) that extends from a raised pivot support (215) of the right front folding piece (2) to the raised pivot support (415) of the right rear folding piece (4) in the disclosed exemplary embodiment. The right rear stanchion (411) of the right rear folding piece (4) is also depicted in the Figure. In FIG. 52, the living hinge is both a means for pivoting the right front folding piece (2) with respect to the right rear folding piece (4) and a pivot of the hinge between the right front folding piece (2) and the right rear folding piece (4).

Figure 53:
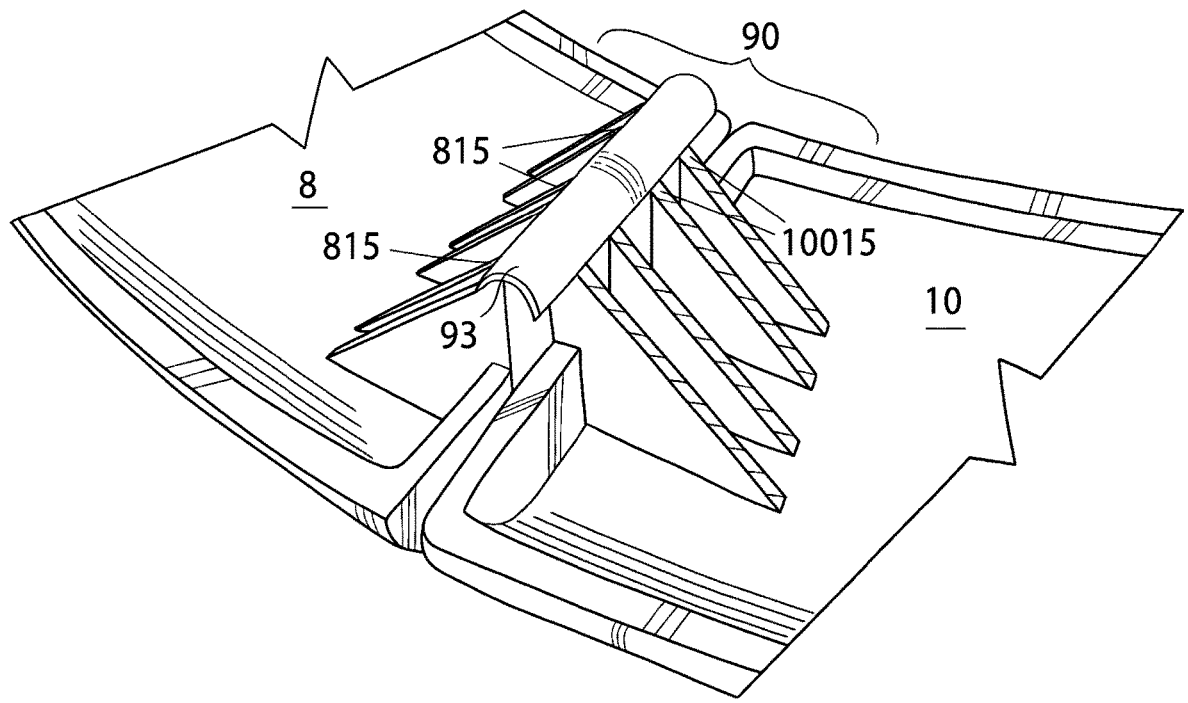
FIG. 53 is a bottom left perspective view of an exemplary embodiment of a living hinge as a hinge connection means connecting a left rear folding piece to a left front folding piece.

FIG. 53 is a bottom left perspective view of an exemplary embodiment of a living hinge (93) as a hinge connection means (90) connecting a left rear folding piece (8) to a left front folding piece (10). FIG. 53 discloses a left front folding piece (10) and a left rear folding piece (8) that are connected via a hinge connection means (90) that is depicted as a living hinge (93) that extends from a raised pivot support (10015) of the left front folding piece (10) to the raised pivot support (815) of the left rear folding piece (8) in the disclosed exemplary embodiment. In FIG. 53, the living hinge is both a means for pivoting the left front folding piece (10) with respect to the left rear folding piece (8) and a pivot of the hinge between the left front folding piece (10) and the left rear folding piece (8).

Figure 54:
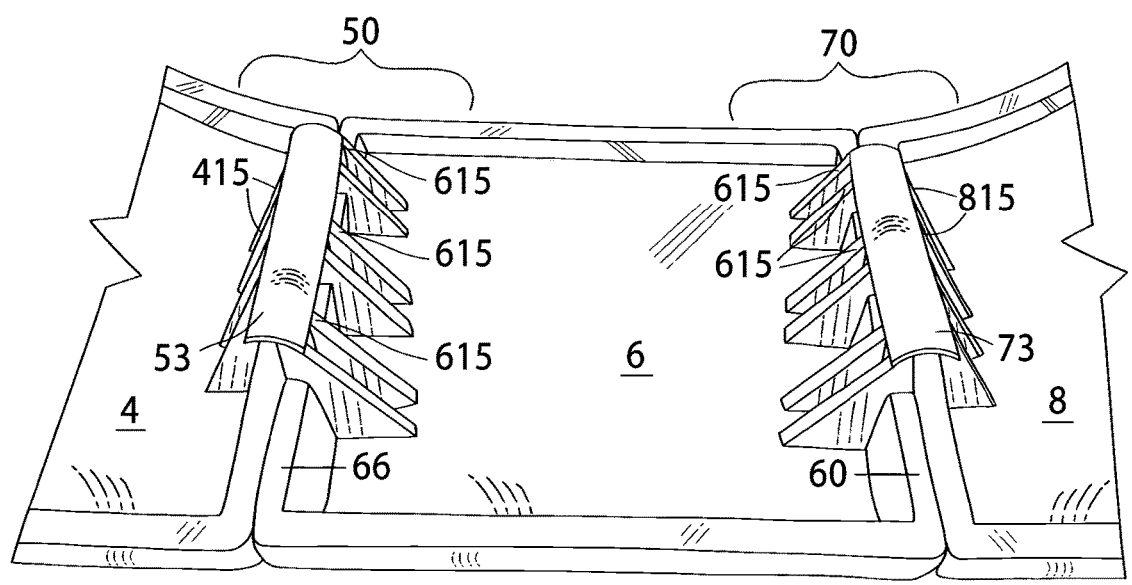
FIG. 54 is a bottom rear perspective view of an exemplary embodiment of a left and right rear connecting piece comprising a plurality of living hinges as hinge connection means to connect the left and right rear connecting piece to the right rear folding piece and the left rear folding piece.

FIG. 54 is a bottom rear perspective view of an exemplary embodiment of a left and right rear connecting piece (6) comprising a plurality of living hinges as hinge connection means to connect the left and right rear connecting piece (6) to the right rear folding piece (4) and the left rear folding piece (8).

FIG. 54 discloses a right rear folding piece (4) and a left and right rear connecting piece (6) that are connected via a hinge connection means (50) that is depicted as a living hinge (53) that extends from a raised pivot support (415) of the right rear folding piece (4) to the raised pivot support (615) of the left and right rear connecting piece (6) in the disclosed exemplary embodiment.

FIG. 54 further discloses a left rear folding piece (8) and a left and right rear connecting piece (6) that are connected via a hinge connection means (70) that is depicted as a living hinge (73) that extends from a raised pivot support (815) of the left rear folding piece (8) to the raised pivot support (615) of the left and right rear connecting piece (6) in the disclosed exemplary embodiment.

In FIG. 54, the living hinge (50) is both a means for pivoting the right rear folding piece (4) with respect to the left and right rear connecting piece (6) and a pivot of the hinge between the right rear folding piece (4) and the left and right rear connecting piece (6). Similarly, in FIG. 54, the living hinge (70) is both a means for pivoting the left rear folding piece (8) with respect to the left and right rear connecting piece (6) and a pivot of the hinge between the left rear folding piece (8) and the left and right rear connecting piece (6).

Third Exemplary Embodiment: An Anti-Viral, Anti-Bacterial and Anti-Fungal Toilet Seat Made of Multiple Pieces and Containing At Least One Living Hinge, Said Seat Being Resistant to Algae, Mold and Mildew and that Can Be Safely Folded and Held without the Danger of Pinched Fingers In yet another series of exemplary embodiments, it is possible to construct the portable foldable toilet seat in which at least one living hinge is used as a means for hingedly connecting one or more of the following:

the right front folding piece (2) to the right rear folding piece (4),
the right rear folding piece (4) to the left and right rear connecting piece (6),
the left and right rear connecting piece (6) to the left rear folding piece (8), or
the left rear folding piece (8) to the left front folding piece (10).

For instance, in one exemplary embodiment, a living hinge could be used to connect the right rear folding piece (4) to the left and right rear connecting piece (6) and the left and right rear connecting piece (6) to the left rear folding piece (8) in the manner described in the Second Exemplary Embodiment and the following elements could use means for hingedly connecting to each other as described in the First Exemplary Embodiment:

the right front folding piece (2) to the right rear folding piece (4) and
the left rear folding piece (8) to the left front folding piece (10).

In another exemplary embodiment, a living hinge could be used to connect the right front folding piece (2) to the right rear folding piece (4) in the manner described in the Second Exemplary Embodiment and the following elements could use means for hingedly connecting to each other as described in the First Exemplary Embodiment:

the right rear folding piece (4) to the left and right rear connecting piece (6), the left and right rear connecting piece (6) to the left rear folding piece (8), and the left rear folding piece (8) to the left front folding piece (10).

In another exemplary embodiment, a living hinge could be used to connect the left rear folding piece (8) to the left front folding piece (10) in the manner described in the Second Exemplary Embodiment and the following elements could use means for hingedly connecting to each other as described in the First Exemplary Embodiment:

the right front folding piece (2) to the right rear folding piece (4), the right rear folding piece (4) to the left and right rear connecting piece (6), and the left and right rear connecting piece (6) to the left rear folding piece (8).

In another exemplary embodiment, a living hinge could be used to connect the right front folding piece (2) to the right rear folding piece (4) and the left rear folding piece (8) to the left front folding piece (10) in the manner described in the Second Exemplary Embodiment and the following elements could use means for hingedly connecting to each other as described in the First Exemplary Embodiment:

the right rear folding piece (4) to the left and right rear connecting piece (6) and the left and right rear connecting piece (6) to the left rear folding piece (8).

In another exemplary embodiment, a living hinge could be used to connect the right front folding piece (2) to the right rear folding piece (4), the right rear folding piece (4) to the left and right rear connecting piece (6), the left and right rear connecting piece (6) to the left rear folding piece (8) in the manner described in the Second Exemplary Embodiment and the following elements could use means for hingedly connecting to each other as described in the First Exemplary Embodiment:

the left rear folding piece (8) to the left front folding piece (10).

In another exemplary embodiment, a living hinge could be used to connect the right rear folding piece (4) to the left and right rear connecting piece (6), the left and right rear connecting piece (6) to the left rear folding piece (8) and the left rear folding piece (8) to the left front folding piece (10) in the manner described in the Second Exemplary Embodiment and the following elements could use means for hingedly connecting to each other as described in the First Exemplary Embodiment:

the right front folding piece (2) to the right rear folding piece (4).

All such embodiments are covered by this application.

Figure 18:
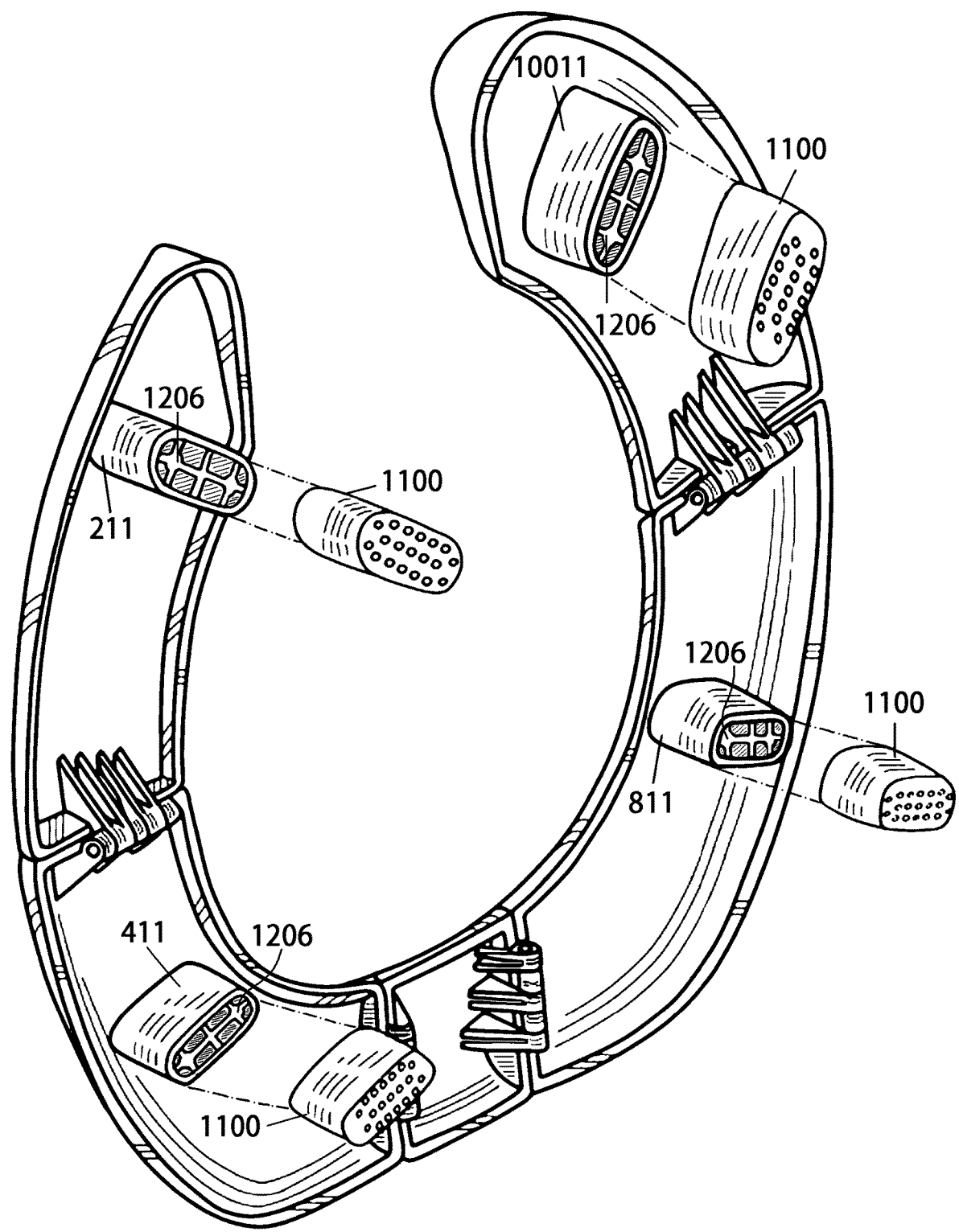
FIG. 18 is a bottom right perspective view of an exemplary embodiment showing how exemplary embodiments of tractive pad members fit over an exemplary embodiment of a right front stanchion, an exemplary embodiment of a left front stanchion, an exemplary embodiment of a right rear stanchion and an exemplary embodiment of a left rear stanchion.

Fourth Exemplary Embodiment: An Anti-Viral, Anti-Bacterial and Anti-Fungal Toilet Seat that is Resistant to Algae, Mold and Mildew and that Can Be Safely Folded and Held without the Danger of Pinched Fingers that is Equipped with Tractive Pad Members It is possible to equip the apparatuses described in the preceding Exemplary Embodiments with tractive pad members that fit over one or more of the following: any right front stanchion, any right rear stanchion, any left rear stanchion and any left front stanchion to make the toilet seat less likely to slide when placed on a porcelain toilet bowl or a toilet seat made of plastic, wood or other material. The placement of such tractive pad members is illustrated by the exemplary embodiment depicted in FIG. 18. FIG. 18 shows a plurality of tractive pad members (1100) that fit conformably over the right front stanchion (211), the right rear stanchion (411), the left rear stanchion (811) and the left front stanchion (10011). Structural support members (1206) are also illustrated in the otherwise hollow interior of the stanchions. The tractive pad members are comprised of substances that possess a high coefficient of sliding friction on porcelain, plastic and other hard surfaces, said substances comprising, for example, rubber.

FIG. 19 is a bottom plan view of an exemplary embodiment of a portable foldable toilet seat in which exemplary embodiments of tractive pad members (1100) are fitted over exemplary embodiments of a right front stanchion on a right front folding piece (2), a left front stanchion on a left front folding piece (10), a right rear stanchion on a right rear folding piece (4) and a left rear stanchion on a left rear folding piece (8). FIG. 19 further depicts the right rear folding piece in a first position, the left rear folding piece in a first position, the right front folding piece in a first position and the left front folding piece in a first position all of which along with a left and right rear connecting piece (6) are circumferentially arranged around a central aperture (11).

Figure 14:
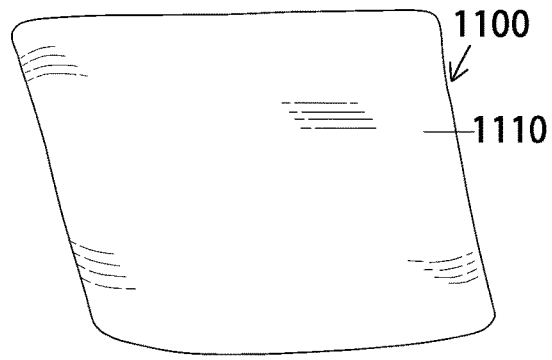
FIG. 14 is a left elevation view of an exemplary embodiment of a tractive pad member.

FIG. 14 is a left elevation view of an exemplary embodiment of a tractive pad member (1100). The exemplary embodiment depicted in FIG. 14 has a side wall (1110) that is solid and that fully encompasses a stanchion, such as a right front stanchion (211), a right rear stanchion (411), a left rear stanchion (611) or a left front stanchion (10011), such as those that are depicted in FIG. 18. However, the side wall (1110) need not be solid. Other possible embodiments of the side wall (1110) might not be solid; such embodiments might, for example contain holes of various shapes in the side wall (1110) or a band that surrounds a stanchion and from which a bottom surface could be suspended on the bottom of the stanchion with threads or with strips of rubber or other material. In still yet another alternative embodiment, the bottom surface of the stanchion might be suspended with threads or with strips of rubber or other material from a protruding feature on the side of a stanchion. All such embodiments are side walls of tractive pad members within the scope of this application.

Figure 15:
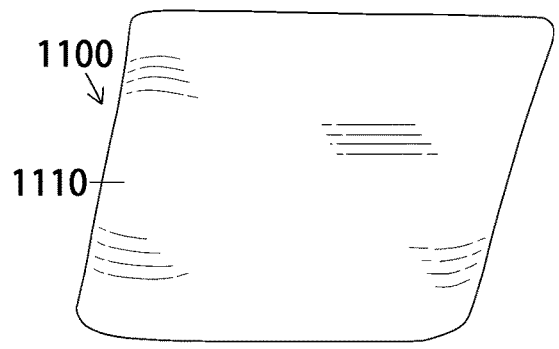
FIG. 15 is a right elevation view of an exemplary embodiment of a tractive pad member.

FIG. 15 is a right elevation view of an exemplary embodiment of a tractive pad member (1100). The exemplary embodiment depicted in FIG. 15 possesses a side wall (1110). The illustrated exemplary embodiment shows a side wall (1110) and a bottom surface (1102).

Figure 16:
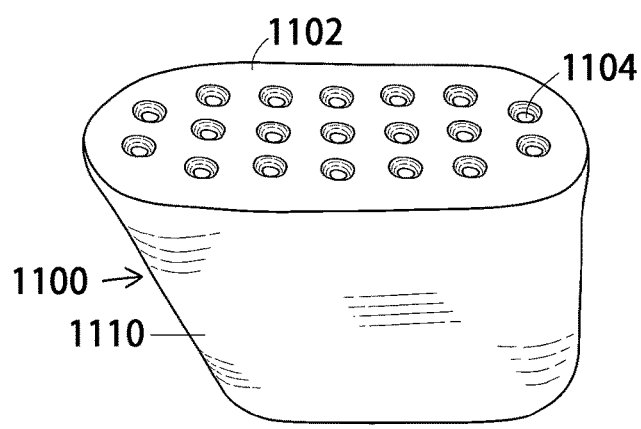
FIG. 16 is a bottom left perspective of an exemplary embodiment of a tractive pad member.

FIG. 16 is a bottom left perspective of an exemplary embodiment of a tractive pad member (1100). In FIG. 16, the bottom surface is depicted as containing a plurality of traction increasing features (1104), such as, for example, the circular divots that are depressed below the bottom surface (1102) as illustrated in FIG. 16. However, in other exemplary embodiments, the traction increasing features (1104) could be singular or plural and also could be other shapes that are depressed below the bottom surface, such as, for example, an ellipse, a square, a rectangle, a polygon of any shape or an irregular or semi-irregular shape such as those found on the treads of tires or any combination thereof. In yet other exemplary embodiments, the traction increasing features (1104) could be singular or plural and also could be other shapes that are raised above the bottom surface, such as, for example, a dot, an ellipse, a square, a rectangle, a polygon of any shape or an irregular or semi-irregular shape such as those found on the treads of tires or any combination thereof. In still further exemplary embodiments, the traction increasing features (1104) could be singular or plural, some of which could be depressed below the bottom surface (1102) and some of which could be raised above the bottom surface and which could be a divot, a dot, an ellipse, a square, a rectangle, a polygon of any shape or an irregular or semi-irregular shape such as those found on the treads of tires or any combination thereof. In yet another exemplary embodiment, the bottom surface (1102) illustrated in FIG. 16 might be featureless without any voids of any shape below the bottom surface and devoid of any material protruding above the bottom surface, the traction increasing feature could be the material itself. In still yet another embodiment, the bottom surface (1102) may not contain traction increasing features at all. All such embodiments are bottom surfaces (1102) of tractive pad members (1100) within the scope of this application.

Figure 17:
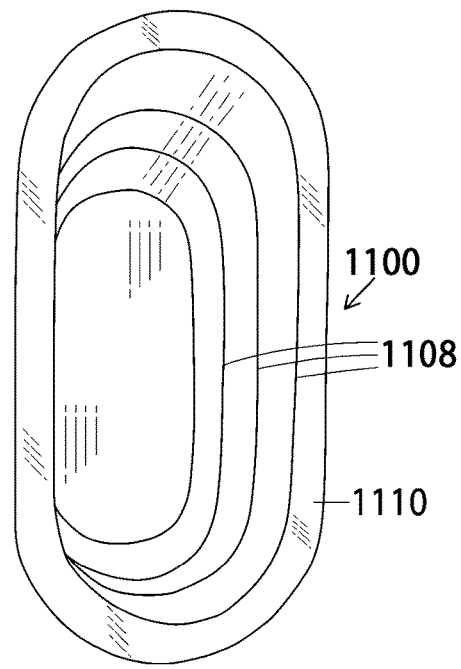
FIG. 17 is a top left perspective view of an exemplary embodiment of a tractive pad member.

FIG. 17 is a top left perspective view of an exemplary embodiment of a tractive pad member (1100). FIG. 17 illustrates an exemplary embodiment comprised of side walls (1110), an interior of the bottom surface (1106), a plurality of stanchion gripping ridges (1108) that are raised above the inner surface of the side walls to provide friction with the side of a stanchion and an open top through which a stanchion may pass so that the tractive pad member may fit over a stanchion. In another exemplary embodiment of a tractive pad member, the inner surface of the side walls of the tractive pad members might be free of any gripping ridges or other means for increasing friction between a tractive pad member and a stanchion. In still another exemplary embodiment of a tractive pad member, the inner surface of the side walls of the tractive pad members might be comprised of one or more raised features in the form of a dot, an ellipse, a square, a rectangle, a polygon of any shape or an irregular or semi-irregular shape such as those found on the treads of tires or any combination thereof. In yet another exemplary embodiment of a tractive pad member, the inner surface of the side walls of the tractive pad members might be comprised of one or more depressed features in the form of a divot, an ellipse, a square, a rectangle, a polygon of any shape or an irregular or semi-irregular shape such as those found on the treads of tires or any combination thereof. In yet another exemplary embodiment, the inner surface of the side walls of the tractive pad members might be comprised of one or more raised or depressed features in the form of a divot, a dot, an ellipse, a square, a rectangle, a polygon of any shape or an irregular or semi-irregular shape such as those found on the treads of tires or any combination of the preceding. All such embodiments are inner surfaces of the side walls of tractive pad members (1100) within the scope of this application.

Definitions.

For ease of understanding this specification, the following terms are defined as indicated below unless stated otherwise elsewhere. At no time are any of these definitions intended to limit the scope of the claims unless it is expressly adopted in the claim language itself. Similarly, reference to particular examples within each definition are exemplary and non-limiting.

"Living hinge" is a flexure bearing made from the same material as the two rigid pieces that it connects. One embodiment of a living hinge comprises a purposeful fault line at a predetermined point in a material which will allow the material to bend and not fail after repeated bending.

"Stadium" is a two-dimensional geometric shape constructed of a rectangle with semicircles at a pair of opposite sides. The same shape is known also as a discorectangle, an obround, or a sausage body.

"Stanchion" is an upright member that supports the portable foldable toilet seat; although stanchions are depicted in a non-limiting embodiment as support members that are stadium-shaped when viewed from below; a stanchion could, when viewed from below, be a circle, an ellipse, a square, a rectangle, or a polygon of any shape, and any of the stanchions could be of a different geometric shape from any of the other stanchions or any stanchion could be the same shape geometrically as some or all of the other stanchions; an arch or a partial arch is also a stanchion. Further, although the stanchions are depicted in a non-limiting embodiment as being partially filled with structural support members [(1206), FIG. 18], a stanchion could have any internal configuration such as, for example, being solid, hollow or containing a void or multiple voids within its volume. The height of a stanchion (or how tall a stanchion is) is measured from the bottom surface from which the stanchion extends to the highest furthest point on the stanchion from the bottom surface.

While the present exemplary embodiments are shown in the drawings and fully described above with particularity and detail, it will be apparent to those of ordinary skill in the art that many modifications thereof may be made without departing from the principles and concepts set forth herein, including, but not limited to, variations in size, materials, shape, form, function and manner of operation, assembly, and use.

Hence, the proper scope of the present application should be determined only by the appended claims to encompass all such modifications as well as all relationships equivalent to those illustrated in the drawings and described in the specification.

Finally, it will be appreciated that the purpose of the annexed Abstract is to enable various patent offices throughout the world, the public generally, and especially the scientists, engineers, and practitioners in the art who are not familiar with patent or legal terms or phraseology, to determine quickly from a cursory inspection the nature and essence of the technical disclosure of this application. Accordingly, the Abstract is not intended to define the invention or the application, which are defined only by the claims, and the Abstract is not intended to limit the scope of the invention in any way.

INDUSTRIAL APPLICABILITY

The disclosed embodiments and the methods associated therewith have applicability to the area of portable toilet seats and to anti-viral, anti-bacterial and anti-fungal technology that is also resistant to algae, mold and mildew.

CITATION LIST

Patent Literature

Anderson, in U.S. Pat. No. 2,537,504, "Combination Child's Toilet Seat and Carrying Bag."

Edwards, in U.S. Pat. No. 5,090,063, "Packaged Toilet Seat."

Schneider, in U.S. Pat. No. 6,175,968, "Transportable and Foldable Toilet Seat Attachment Device."

Jackson, in WO 2016/109328, "Toilet Seat Cover Assembly."

The following claims define the invention in which an exclusive right is claimed:

1. An apparatus, a portable foldable toilet seat, comprising:
    a right front folding piece, comprising
        a right front outer perimetric surface that extends from an outer anterior apex to an outer posterior apex;
        a right front posterior surface that extends from the outer posterior apex to an inner posterior apex;
        a right front inner perimetric surface that extends from an inner anterior apex to the inner posterior apex;
        an open right front surface that extends from the outer anterior apex to the inner anterior apex;
        a top sitting surface;
        a bottom surface;
        a right front stanchion protruding downward from the bottom surface of the right front folding piece; and
        a raised pivot support protruding downward from the bottom surface of the right front folding piece that is at least the longer of the distance that the tallest right front stanchion protrudes from the bottom surface of the right front folding piece or of the distance that the tallest right rear stanchion protrudes from a bottom surface of a right rear folding piece;
    a right rear folding piece, comprising
        a right rear outer perimetric surface extending from an outer anterior apex to an outer posterior apex;
        a right rear connecting surface extending from the outer posterior apex to an inner posterior apex, the right rear connecting surface comprising
            a raised pivot support protruding downward from a bottom surface on the right rear connecting surface;
        a right rear inner perimetric surface extending from an inner anterior apex to the inner posterior apex;
        an anterior surface extending from the outer anterior apex to the inner anterior apex, the anterior surface comprising
            a raised pivot support on the anterior surface protruding downward from the bottom surface of the right rear folding piece that is at least the longer of the distance that the tallest right front stanchion protrudes from the bottom surface of the right front folding piece or of the distance that the tallest right rear stanchion protrudes from the bottom surface of the right rear folding piece;
        a top sitting surface;
        the bottom surface; and
        a right rear stanchion that extends down from the bottom surface and that is positioned in such a manner that no right rear stanchion will make contact with any right front stanchion when the right front folding piece is folded toward the right rear folding piece;
    a left and right rear connecting piece, comprising
        a right side extending from a right anterior apex to a right posterior apex;
        an anterior side extending from the right anterior apex to a left anterior apex;
        a left side extending from the left anterior apex to a left posterior apex;
        a posterior side extending from the right posterior apex to the left posterior apex;
        a top sitting surface;
        a bottom surface;
        a raised pivot support protruding downward from the right side; and
        a raised pivot support protruding downward from the left side;
    a left rear folding piece, comprising
        a left rear outer perimetric surface extending from an outer anterior apex to an outer posterior apex;
        a left rear connecting surface extending from the outer posterior apex to an inner posterior apex, the left rear connecting surface comprising
            a raised pivot support protruding downward from a bottom surface on the left rear connecting surface;
        a left rear inner perimetric surface extending from an inner anterior apex to the inner posterior apex;
        an anterior surface extending from an outer anterior apex to the inner anterior apex, the anterior surface comprising
            a raised pivot support on the anterior surface protruding downward from the bottom surface of the left rear folding piece that is at least the longer of the distance that the tallest left front stanchion protrudes downward from the bottom surface of the left front folding piece or the distance that the tallest left rear stanchion protrudes from the bottom surface of the right rear folding piece;
        a top sitting surface;
        the bottom surface; and
        a left rear stanchion that extends down from the bottom surface and that is positioned in such a manner that no left rear stanchion will make contact with any left front stanchion when the left front folding piece is folded toward the left rear folding piece;
    a left front folding piece, comprising
        a left front outer perimetric surface that extends from an outer anterior apex to an outer posterior apex;
        a left front posterior surface that extends from the outer posterior apex to an inner posterior apex;
        a left front inner perimetric surface that extends from an inner anterior apex to the inner posterior apex;
        an open left front surface that extends from the outer anterior apex to the inner anterior apex;
        a top sitting surface;
        a bottom surface;
        a left front stanchion protruding downward from the bottom surface of the left front folding piece; and
        a raised pivot support protruding downward from the bottom surface of the left front folding piece that is at least the longer of the distance that the tallest left front stanchion protrudes from the bottom surface of the left front folding piece;
    circumferentially arranged around a central aperture wherein
        the right front folding piece is joined to the right rear folding piece by a hinge connection means, said hinge connection means comprising a pivot such as a hinge pin, a living hinge, or a barrel hinge;
        the right rear folding piece is joined to the left and right rear connecting piece by a hinge connection means, said hinge connection means comprising a pivot such as a hinge pin, a living hinge, or a barrel hinge;
        the left rear folding piece is joined to the left and right rear connecting piece by a hinge connection means, said hinge connection means comprising a pivot such as a hinge pin, a living hinge, or a barrel hinge; and
        the left and right rear connecting piece is joined to the left front folding piece by a hinge connection means, said hinge connection means comprising a pivot such as a hinge pin, a living hinge, or a barrel hinge.

2. An apparatus, a portable foldable toilet seat, made of one piece, the apparatus comprising:
 a right front folding piece, comprising
  a right front outer perimetric surface that extends from an outer anterior apex to an outer posterior apex;
  a right front posterior surface that extends from the outer posterior apex to an inner posterior apex;
  a right front inner perimetric surface that extends from an inner anterior apex to the inner posterior apex;
  an open right front surface that extends from the outer anterior apex to the inner anterior apex;
  a top sitting surface;
  a bottom surface;
  a right front stanchion protruding downward from the bottom surface of the right front folding piece; and
  a raised pivot support protruding downward from the bottom surface of the right front folding piece that is at least the longer of the distance that the tallest right front stanchion protrudes from the bottom surface of the right front folding piece or of the distance that the tallest right rear stanchion protrudes from a bottom surface of a right rear folding piece;
 a living hinge that connects the right front folding piece to a right rear folding piece;
 the right rear folding piece, comprising
  a right rear outer perimetric surface extending from an outer anterior apex to an outer posterior apex;
  a right rear connecting surface extending from the outer posterior apex to an inner posterior apex;
  a right rear inner perimetric surface extending from an inner anterior apex to the inner posterior apex;
  an anterior surface extending from the outer anterior apex to the inner anterior apex, the anterior surface comprising
   a raised pivot support on the anterior surface protruding downward from the bottom surface of the right rear folding piece that is at least the longer of the distance that the tallest right front stanchion protrudes from the bottom surface of the right front folding piece or of the distance that the tallest right rear stanchion protrudes from the bottom surface of the right rear folding piece;
  a top sitting surface;
  the bottom surface; and
  a right rear stanchion that extends down from the bottom surface and that is positioned in such a manner that no right rear stanchion will make contact with any right front stanchion when the right front folding piece is folded toward the right rear folding piece;
 a living hinge that connects the right rear folding piece to a left and right rear connecting piece;
 the left and right rear connecting piece, comprising
  a right side extending from a right anterior apex to a right posterior apex;
  an anterior side extending from the right anterior apex to a left anterior apex;
  a left side extending from the left anterior apex to a left posterior apex;
  a posterior side extending from the right posterior apex to the left posterior apex;
  a top sitting surface;
  a bottom surface;
  a raised pivot support protruding downward from the right side; and
  a raised pivot support protruding downward from the left side;
 a living hinge that connects the left and right rear connecting piece to a left rear folding piece;
 the left rear folding piece, comprising
  a left rear outer perimetric surface extending from an outer anterior apex to an outer posterior apex;
  a left rear connecting surface extending from the outer posterior apex to an inner posterior apex;
  a left rear inner perimetric surface extending from an inner anterior apex to the inner posterior apex;
  an anterior surface extending from an outer anterior apex to the inner anterior apex, the anterior surface comprising
   a raised pivot support on the anterior surface protruding downward from the bottom surface of the left rear folding piece that is at least the longer of the distance that the tallest left front stanchion protrudes downward from the bottom surface of the left front folding piece or the distance that the tallest left rear stanchion protrudes from the bottom surface of the right rear folding piece;
  a top sitting surface;
  the bottom surface; and
  a left rear stanchion that extends down from the bottom surface and that is positioned in such a manner that no left rear stanchion will make contact with any left front stanchion when the left front folding piece is folded toward the left rear folding piece;
 a living hinge that connects the left rear folding piece to a left front folding piece;
 the left front folding piece, comprising
  a left front outer perimetric surface that extends from an outer anterior apex to an outer posterior apex;
  a left front posterior surface that extends from the outer posterior apex to an inner posterior apex;
  a left front inner perimetric surface that extends from an inner anterior apex to the inner posterior apex;
  an open left front surface that extends from the outer anterior apex to the inner anterior apex;
  a top sitting surface;
  a bottom surface;
  a left front stanchion protruding downward from the bottom surface of the left front folding piece; and
  a raised pivot support protruding downward from the bottom surface of the left front folding piece that is at least the longer of the distance that the tallest left front stanchion protrudes from the bottom surface of the left front folding piece;
 circumferentially arranged around a central aperture.

3. The apparatus of claim 1 in which at least one living hinge is used to connect one or more of the following:
 the right front folding piece to the right rear folding piece;
 the right rear folding piece to the left and right rear connecting piece;
 the left and right rear connecting piece to the left rear folding piece; or
 the left rear folding piece to the left front folding piece.

4. The apparatus of claim 1, 2 or 3 further comprising tractive pad members that fit over one or more of the following: the right front stanchion, the right rear stanchion, the left rear stanchion and the left front stanchion.

5. The apparatus of claim 1, 2 or 3 wherein at least part of the apparatus is comprised of a means for dissemination of metallic ions to give the surface anti-viral, anti-bacterial, anti-fungal, anti-algae, anti-mold and anti-mildew properties, said means including plastics such as ABS that are impregnated with inorganic carrying compounds that are capable of dissociating into metal ions, said inorganic carrying compounds including substances such as soluble glass, zirconium phosphate, calcium phosphate, zeolite, silica gel, titanium oxide and porous ceramics that contain, and allow for the dissemination of, metal ions via ion-exchange, said metal ions comprising one or more metals such as silver, copper, zinc, iron, gold, platinum, palladium, lead, tin, mercury, cadmium, chromium, nickel and cobalt.

6. The tractive pads of claim 4, wherein at least part of the tractive pads is comprised of a means for dissemination of metallic ions to give the surface anti-viral, anti-bacterial, anti-fungal, anti-algae, anti-mold and anti-mildew properties, said means including plastics such as ABS that are impregnated with inorganic carrying compounds that are capable of dissociating into metal ions, said inorganic carrying compounds including substances such as soluble glass, zirconium phosphate, calcium phosphate, zeolite, silica gel, titanium oxide and porous ceramics that contain, and allow for the dissemination of, metal ions via ion-exchange, said metal ions comprising one or more metals such as silver, copper, zinc, iron, gold, platinum, palladium, lead, tin, mercury, cadmium, chromium, nickel and cobalt.

7. The apparatus of claim 2 wherein at least one of the living hinges is comprised of a means for dissemination of metallic ions to give the surface anti-viral, anti-bacterial, anti-fungal, anti-algae, anti-mold and anti-mildew properties, said means comprising:
   plastics, such as ABS, that are impregnated with inorganic carrying compounds capable of dissociating into metal ions,
   said inorganic carrying compounds being selected from one or more of the following:
      soluble glass,
      zirconium phosphate,
      calcium phosphate,
      zeolite,
      silica gel,
      titanium oxide, and
      porous ceramics; and
   said metal ions being ions of one or more of the following:
      silver,
      copper,
      zinc,
      iron,
      gold,
      platinum,
      palladium,
      lead,
      tin,
      mercury,
      cadmium,
      chromium,
      nickel, and
      cobalt.

8. The apparatus of claim 3 wherein at least one living hinge is comprised of a means for dissemination of metallic ions to give the surface anti-viral, anti-bacterial, anti-fungal, anti-algae, anti-mold and anti-mildew properties, said means comprising:
   plastics, such as ABS, that are impregnated with inorganic carrying compounds capable of dissociating into metal ions,
   said inorganic carrying compounds being selected from one or more of the following:
      soluble glass,
      zirconium phosphate,
      calcium phosphate,
      zeolite,
      silica gel,
      titanium oxide, and
      porous ceramics; and
   said metal ions being ions of one or more of the following:
      silver,
      copper,
      zinc,
      iron,
      gold,
      platinum,
      palladium,
      lead,
      tin,
      mercury,
      cadmium,
      chromium,
      nickel, and
      cobalt.

* * * * *